(12) United States Patent
Yoshida et al.

(10) Patent No.: US 8,947,607 B2
(45) Date of Patent: Feb. 3, 2015

(54) ACTIVE MATRIX SUBSTRATE AND DISPLAY DEVICE

(75) Inventors: Masahiro Yoshida, Osaka (JP);
Takaharu Yamada, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 54 days.

(21) Appl. No.: 13/991,968

(22) PCT Filed: Dec. 5, 2011

(86) PCT No.: PCT/JP2011/078102
§ 371 (c)(1),
(2), (4) Date: Jun. 6, 2013

(87) PCT Pub. No.: WO2012/077646
PCT Pub. Date: Jun. 14, 2012

(65) Prior Publication Data
US 2013/0250226 A1 Sep. 26, 2013

(30) Foreign Application Priority Data
Dec. 8, 2010 (JP) ................................. 2010-274002

(51) Int. Cl.
*G02F 1/1343* (2006.01)
(52) U.S. Cl.
CPC ................................. *G02F 1/134336* (2013.01)
USPC ........................................................ 349/39
(58) Field of Classification Search
USPC ........................................................ 349/39
See application file for complete search history.

(56) References Cited

U.S. PATENT DOCUMENTS

| | | | |
|---|---|---|---|
| 6,411,346 B1 * | 6/2002 | Numano et al. | 349/39 |
| 7,417,691 B2 | 8/2008 | Chung et al. | |
| 7,796,221 B2 * | 9/2010 | Kamada et al. | 349/139 |
| 7,812,893 B2 * | 10/2010 | Yagi et al. | 349/39 |
| 7,990,503 B2 | 8/2011 | Tasaka et al. | |
| 8,264,630 B2 * | 9/2012 | Ueda et al. | 349/43 |
| 8,411,239 B2 | 4/2013 | Yoshida et al. | |
| 8,614,658 B2 * | 12/2013 | Takeuchi et al. | 345/87 |
| 2007/0024786 A1 | 2/2007 | Tanaka et al. | |
| 2007/0153194 A1 | 7/2007 | Wang et al. | |

(Continued)

FOREIGN PATENT DOCUMENTS

| | | |
|---|---|---|
| JP | 04-342234 A | 11/1992 |
| JP | 2006-154080 A | 6/2006 |

(Continued)

OTHER PUBLICATIONS

Official Communication issued in International Patent Application No. PCT/JP2011/078102, mailed on Jan. 31, 2012.

(Continued)

*Primary Examiner* — James Dudek
(74) *Attorney, Agent, or Firm* — Keating & Bennett, LLP

(57) ABSTRACT

A storage capacitor counter electrode (22) provided on an active matrix substrate (100) includes a first portion (22b) creating a storage capacitance with a storage capacitor bus line (12), a second portion (22a) interposed between the first portion (22b) and a drain electrode (24), and a third portion (22c) being provided opposite from the second portion (22a) with the first portion (22b) sandwiched therebetween and protruding from the first portion (22b). The third portion (22c) is disposed so as not to overlie any pixel electrode other than a pixel electrode (30) that is electrically connected to the drain electrode (24).

18 Claims, 21 Drawing Sheets

(56) References Cited

U.S. PATENT DOCUMENTS

| | | |
|---|---|---|
| 2010/0277661 A1 | 11/2010 | Ueda et al. |
| 2012/0154703 A1 | 6/2012 | Yoshida et al. |

FOREIGN PATENT DOCUMENTS

| | | |
|---|---|---|
| JP | 2006-201355 A | 8/2006 |
| JP | 2006-330633 A | 12/2006 |
| JP | 2007-183643 A | 7/2007 |
| WO | 2009/125532 A1 | 10/2009 |
| WO | 2010/092706 A1 | 8/2010 |
| WO | 2011/024703 A1 | 3/2011 |

OTHER PUBLICATIONS

English translation of Official Communication issued in corresponding International Application PCT/JP2011/078102, mailed on Jun. 20, 2013.

* cited by examiner (a)

(b)

(a)

(b)

(a)

(b)

(a)

(b)

(a)

(b)

(a)

(b)

ACTIVE MATRIX SUBSTRATE AND DISPLAY DEVICE

TECHNICAL FIELD

The present invention relates to an active matrix substrate and a display device in which the same is used; in particular, the present invention relates to a display device having a TFT substrate on which storage capacitors are provided.

BACKGROUND ART

Matrix-type liquid crystal display devices in which thin film transistors (TFTs) are employed as switching elements are widely used as flat-panel television sets, display devices for personal computers, display devices for video imaging devices, and so on. In addition to conventional TN-type liquid crystal display devices, liquid crystal display devices of the VA (Vertical Alignment) mode, which is a vertical alignment mode, the IPS (In-Plane-Switching) mode, which is a lateral electric-field mode, and the like are being developed.

Known VA mode liquid crystal display devices are: liquid crystal display devices of the MVA (Multidomain Vertical Alignment) mode, each of whose pixel includes a plurality of domains with mutually different liquid crystal alignment directions; liquid crystal display devices of the CPA (Continuous Pinwheel Alignment) mode, in which gradually varying liquid crystal alignment directions exist around a rivet or the like that is formed on an electrode at the central portion of a pixel; and the like.

After a predetermined signal voltage is applied to a pixel electrode and until a new signal voltage is applied to this pixel electrode, a TFT remains in an OFF state because no scanning signal for placing the TFT in an ON state is applied to the gate of the TFT. In an unselected-period during which the TFT is in an OFF state, the potential of the pixel electrode is kept substantially constant, thus maintaining the displaying in accordance with this potential.

It has conventionally been known to provide a storage capacitor in parallel to the liquid crystal capacitor, the storage capacitor allowing the potential of a pixel electrode to be retained. Patent Document 1 shows an implementation in which a storage capacitor is formed between an extension of a drain electrode and a storage capacitor electrode (storage capacitor bus line). The extension of the drain electrode is provided so as to overlap the storage capacitor electrode in a region which is inside of the edge (outer edge) of the storage capacitor electrode. Moreover, in this display device, the storage capacitor electrode extends in a manner of overlying an end of the pixel electrode, such that a storage capacitor is created also between the pixel electrode and itself.

Patent Document 2 discloses a technique of creating a storage capacitor by forming, in a region inside the outer edge of an underlying conductive connection line, an overlying conductive portion via an insulating film. The reason why it is formed inside the edge of the underlying connection line is that, if the overlying conductive portion were provided in a manner of intersecting the edge of the underlying connection line, there would be an increased likelihood of current leakage or electrical conduction occurring at this intersecting portion.

Patent Document 3 describes, as a technique of providing a storage capacitor without lowering the aperture ratio of the pixel, forming a storage capacitor line and a storage capacitor electrode in an interspace between a plurality of subpixel electrodes. In this document, too, it is recited that a storage capacitor electrode extending from a drain electrode is provided inside of the edge of an underlying storage capacitor line.

Patent Document 4 and Patent Document 5 also describe liquid crystal display devices in which an extension of the drain electrode of a TFT is provided opposite from a storage capacitor bus line (Cs bus line). The extension of the drain electrode functions as a Cs counter electrode, and creates a storage capacitance between itself and a storage capacitor line, via an insulating film.

Moreover, in the liquid crystal display devices described in Patent Document 4 and Patent Document 5, the portion extending from the drain electrode extends beyond the underlying storage capacitor line. This extension is utilized as a control capacitor electrode, and constitutes capacitive coupling with a subpixel electrode which is in a floating state. To the subpixel electrode in a floating state, a potential which is different from that of another subpixel electrode which is directly connected to the drain electrode is applied via a control capacitor electrode. Such a method of applying different voltages to the two subpixel electrodes included within one pixel is known as a method of pixel division. By introducing liquid crystal regions with different alignment states in one pixel, the viewing angle characteristics can be improved.

CITATION LIST

Patent Literature

[Patent Document 1] specification of U.S. Pat. No. 7,417,691

[Patent Document 2] Japanese Laid-Open Patent Publication No. 4-342234

[Patent Document 3] Japanese Laid-Open Patent Publication No. 2006-154080

[Patent Document 4] Japanese Laid-Open Patent Publication No. 2006-330633

[Patent Document 5] Japanese Laid-Open Patent Publication No. 2006-201355

SUMMARY OF INVENTION

Technical Problem

A TFT substrate is produced by repeatedly performing steps of depositing a conductive film or an insulating film on a substrate and patterning them. For example, a TFT substrate is produced as follows. First, on a substrate such as glass, gate electrodes, gate bus lines, and storage capacitor bus lines, which are composed of a metal film, are provided in predetermined patterns. Thereafter, via a gate insulating film, a semiconductor layer is formed at predetermined positions. Furthermore, source bus lines including source electrodes, and drain electrodes disposed opposite from the source electrodes upon the semiconductor film, are formed.

At this time, in a region above a storage capacitor bus line, a storage capacitor counter electrode (Cs counter electrode) is formed as an extension of the drain electrode, via the gate insulating film. Thereafter, pixel electrodes are provided via an interlayer insulating film and the like. Each pixel electrode and the drain electrode or the Cs counter electrode are electrically connected, via a contact hole which is provided in the interlayer insulating film, for example.

Misalignment may occur during the step of forming Cs counter electrodes on the storage capacitor bus lines via the gate insulating film. This may make it impossible to obtain a storage capacitance of a desired size, thus causing fluctuations in the retention voltage or feed-through voltage (a drop in the potential of a pixel electrode when a selected-period of the TFT is ended). If the level of fluctuation in feed-through voltage greatly varies from pixel to pixel, display quality may be deteriorated. For example, in the case where exposure of the display region occurs over a plurality of times in the patterning step, each exposed region may incur a different amount of misalignment. In this case, the amount of fluctuation in feed-through voltage will differ for each exposed region. The above problem is particularly prominent when the size of one pixel is small, because of an increased ratio, to the overall storage capacitance, of storage capacitance fluctuations that are caused by misalignment.

Moreover, if alignment between a Cs bus line and a Cs counter electrode (extension of the drain electrode) is lost, the size of a parasitic capacitance Cgd which is created between a gate electrode, which is patterned through the same patterning step as the Cs bus line, and the drain electrode, which is patterned through the same patterning step as the Cs counter electrode, will also fluctuate. This also causes variation in the level of the feed-through voltage that occurs when the TFT is switched into an OFF state.

In Patent Documents 4 and 5 above, an extension of the drain electrode also exists in a portion opposing the subpixel electrode, thus defining a control capacitor electrode which creates a coupling capacitance with the subpixel electrode. Therefore, if misalignment occurs and allows the storage capacitance size to fluctuate, the ratio of the coupling capacitance created with the subpixel electrode to the total capacitance of one pixel will fluctuate, and the voltage that is applied across the liquid crystal in the portion where the subpixel electrode is disposed will fluctuate. This may make desired displaying impossible.

Thus, there exists a problem in that, even in the case where misalignment occurs in a TFT substrate production process, an appropriate storage capacitance must be obtained in order to prevent deterioration of display quality. In the absence of an appropriate storage capacitance, flickering or display unevenness may occur in block or strip shapes.

The present invention has been made in view of the above problems, and an objective thereof is to provide an active matrix substrate which provides an appropriate storage capacitance even if a misalignment occurs in the production process, and provide a display device with an improved display quality in which the same is used.

Solution to Problem

An active matrix substrate according to an embodiment of the present invention comprises: a substrate; a gate bus line provided on the substrate; a source bus line provided on the substrate so as to intersect the gate bus line; a TFT provided near an intersection between the gate bus line and the source bus line, the TFT having a gate electrode electrically connected to the gate bus line, a source electrode electrically connected to the source bus line, and a drain electrode; a pixel electrode electrically connected to the drain electrode of the TFT; a storage capacitor bus line provided in parallel to the gate bus line or the source bus line; and a storage capacitor counter electrode electrically connected to the drain electrode to create a storage capacitance with the storage capacitor bus line, wherein the storage capacitor counter electrode includes: a first portion overlapping the storage capacitor bus line to create a substantial storage capacitance; a second portion interposed between the first portion and the drain electrode; and a third portion being provided opposite from the second portion with the first portion sandwiched therebetween, the third portion protruding from the first portion and overlapping the storage capacitor bus line, but not overlapping any pixel electrode other than the pixel electrode electrically connected to the drain electrode of the TFT.

In one embodiment, the third portion includes a portion not overlapping the storage capacitor bus line.

In one embodiment, the storage capacitor bus line includes a bus line portion extending in parallel to the gate bus line, and a branch portion provided in a direction intersecting the bus line portion; and the second portion of the storage capacitor counter electrode and the branch portion of the storage capacitor bus line overlap each other.

In one embodiment, the third portion at an edge of the storage capacitor bus line has a width which is equal to a width of the second portion at the edge of the storage capacitor bus line.

In one embodiment, the third portion at an edge of the storage capacitor bus line has a width which is greater than a width of the second portion at the edge of the storage capacitor bus line.

In one embodiment, the storage capacitor bus line has a recessed portion at a position where the third portion is formed.

In one embodiment, a plurality of pixels are defined; and in at least two pixels among the plurality of pixels, a position of the third portion within the pixel differs.

In one embodiment, a plurality of pixels forming a delta array are defined; and the third portion associated with a predetermined pixel is placed between pixel electrodes of two pixels adjacent to the predetermined pixel in an oblique direction.

In one embodiment, a direction in which the drain electrode extends toward the gate electrode and a direction in which the third portion protrudes from the storage capacitor bus line are 180° apart.

In one embodiment, in a direction which is 180° apart from a direction in which the drain electrode extends toward the gate electrode, a fourth portion of the storage capacitor counter electrode is formed so as to protrude from the storage capacitor bus line.

A display device according to an embodiment of the present invention comprises: the above active matrix substrate; a counter substrate disposed opposite from the active matrix substrate; and a display medium layer disposed between the active matrix substrate and the counter substrate.

In one embodiment, the display medium layer is a liquid crystal layer; at least one of the active matrix substrate and the counter substrate has a black matrix; and the third portion of the storage capacitor counter electrode is disposed at a position overlapping the black matrix.

In one embodiment, the display medium layer is a vertical-alignment type liquid crystal layer; and an alignment regulating structure for forming a plurality of liquid crystal domains is provided on at least one of the active matrix substrate and the counter substrate.

In one embodiment, the third portion of the storage capacitor counter electrode is provided at a position overlapping the alignment regulating structure.

Advantageous Effects of Invention

With an active matrix substrate according to an embodiment of the present invention, an appropriate storage capacitance is obtained even if a misalignment occurs in the production process. Moreover, a display device which is produced by using this active matrix substrate has a good display quality.

DESCRIPTION OF EMBODIMENTS

Hereinafter, with reference to the drawings, the construction of TFT substrates and display devices according to embodiments of the present invention will be described. However, the present invention is not to be limited to the embodiments described below.

<Embodiment 1>

Figure 1:
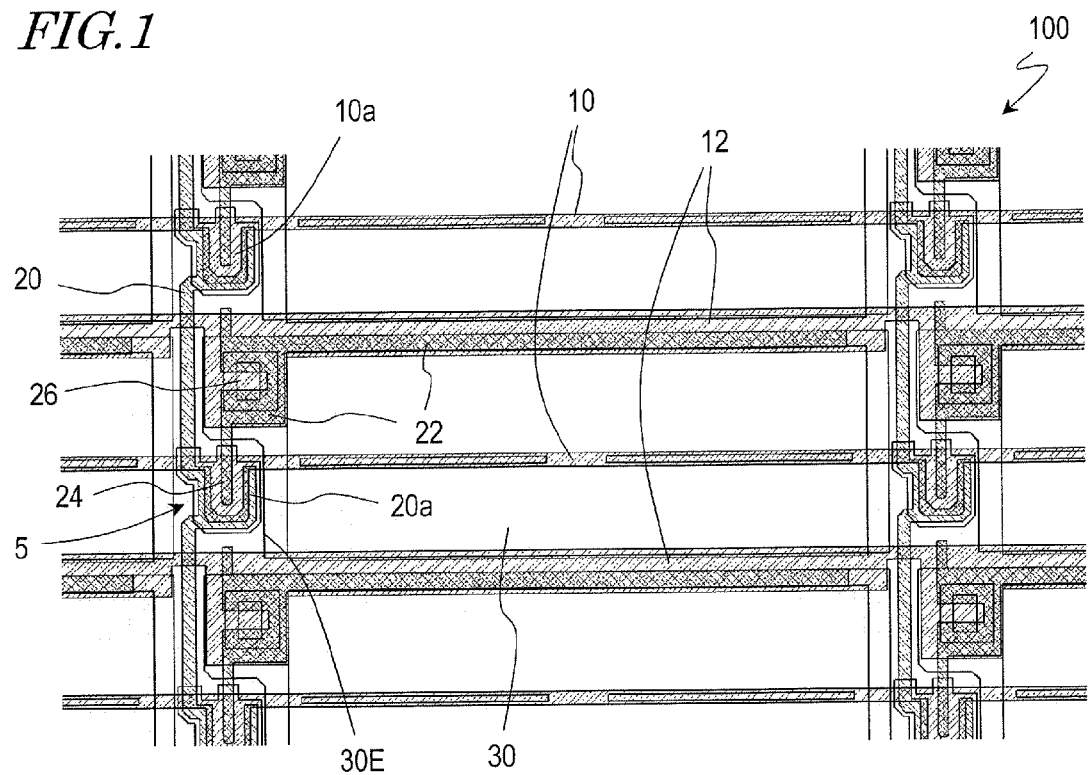
[FIG. 1] A plan view showing a TFT substrate of Embodiment 1.
Figure 2:
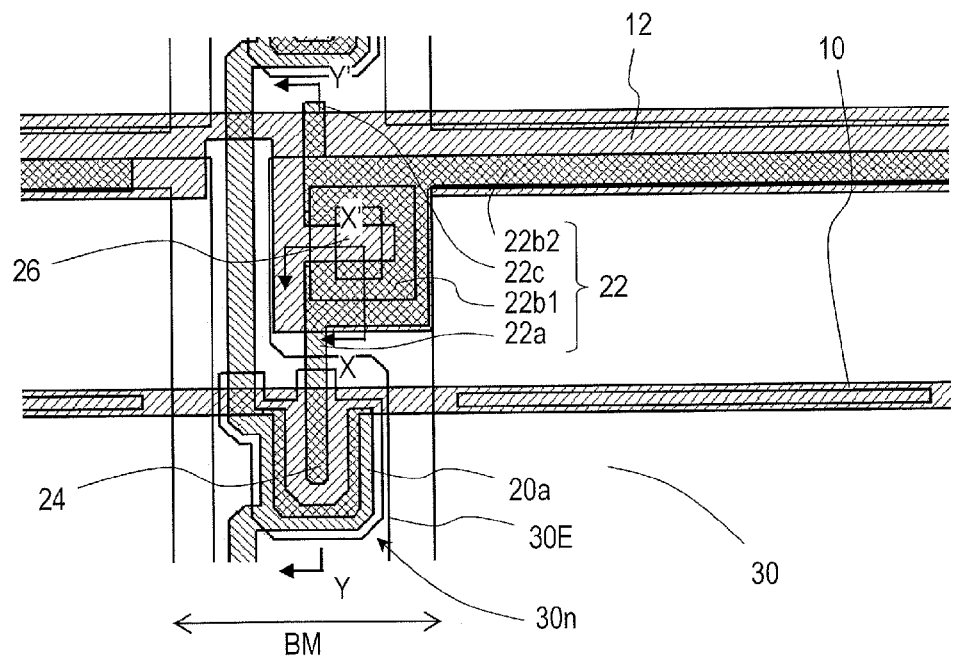
[FIG. 2] An enlarged partial view showing the neighborhood of a TFT in FIG. 1.
Figure 3:
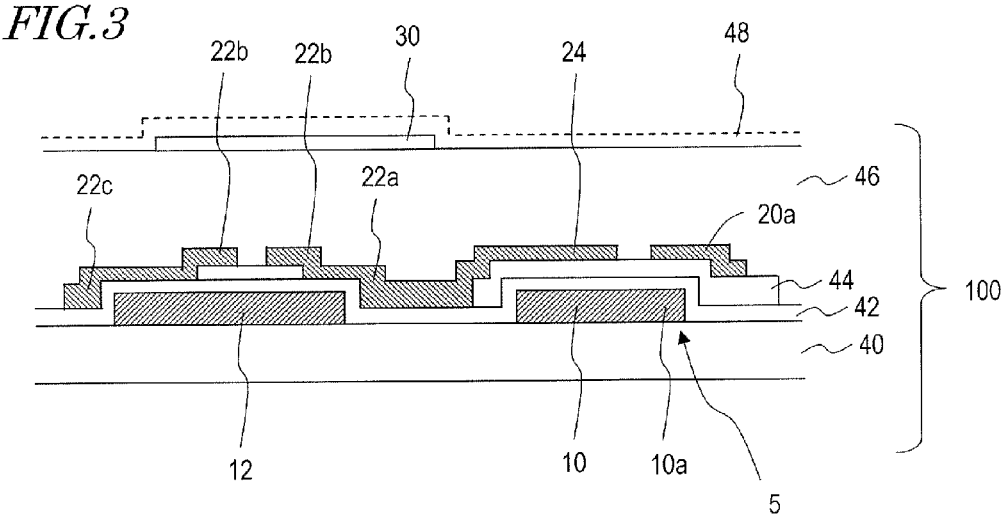
[FIG. 3] A cross-sectional view of the TFT substrate shown in FIG. 2 along line Y-Y'.

FIG. 1 shows a TFT substrate 100 of Embodiment 1, which is to be used in a liquid crystal display device of the TN type or the like. In the TFT substrate 100, pixels are provided in a matrix shape. FIG. 1 shows only one pixel and a neighboring region thereof. In the present embodiment, the size of one pixel is about 270 μm×about 90 μm, the pixel shape being longer from side to side than from top to bottom. Moreover, FIG. 2 is an enlarged partial view of FIG. 1, and FIG. 3 is a cross-sectional view along line Y-Y' of FIG. 2.

First, with reference to FIG. 1 to FIG. 3, the construction of the TFT substrate 100 will be described.

The TFT substrate 100 includes, on a substrate 40, a plurality of gate bus lines (scanning lines) 10 and a plurality of storage capacitor bus lines (Cs bus lines) 12 extending in the horizontal direction, and a plurality of source bus lines (signal line) 20 extending along the vertical direction so as to intersect them. Each Cs bus line is disposed between two adjacent gate bus lines 10. Moreover, a pixel electrode 30 is provided corresponding to each region which is surrounded by two adjacent source bus lines 20 and two adjacent Cs bus lines 12.

Near the intersection between each gate bus line 10 and each source bus line 20, a TFT (thin film transistor) 5 is provided. The TFT 5 includes a gate electrode 10a which is formed integrally with the gate bus line 10, and a source electrode 20a and a drain electrode 24 which are provided on the gate electrode 10a via a gate insulating film 42 and a semiconductor layer 44. The source electrode 20a, which is formed integrally with the source bus line 20, has a U-shape. The drain electrode 24 is provided opposite from the source electrode 20a, in a manner of being entrapped by the U-shaped source electrode 20a. As used herein, the terms "source" and "drain" of the TFT are interchangeable; for example, in the present specification, any portion which is referred to as a "drain electrode" may be called a "source electrode", generally speaking.

The TFT substrate 100 includes a storage capacitor counter electrode 22 (which hereinafter may be referred to as a Cs counter electrode) extending from the drain electrode 24. The Cs counter electrode 22 is formed integrally with the drain electrode 24. Moreover, the Cs counter electrode 22 is electrically connected with the pixel electrode 30 via a contact hole 26, so that the drain electrode 24 and the pixel electrode 30 are in electrical conduction.

As shown in FIG. 2, the Cs counter electrode 22 includes: capacitive portions 22b1 and 22b2 (which hereinafter may be collectively referred to as the capacitive portion 22b) that overlap with the Cs bus line 12 to form a storage capacitance; a connecting portion 22a interposed between the drain electrode 24 and the capacitive portion 22b; and a compensation portion 22c disposed so as to sandwich the capacitive portion 22b between the connecting portion 22a and itself. The compensation portion 22c is disposed opposite from the connecting portion 22a, via the capacitive portion 22b. As shown in FIG. 3, the gate insulating film 42 exists between the capacitive portion 22b of the Cs counter electrode 22 and the Cs bus line 12, such that a storage capacitance Ccs is constituted by them.

In the present embodiment, the pixel electrode 30 has a planar shape with a recess 30n so as not to cover the TFT 5, as its edge 30E indicates in FIG. 1 and FIG. 2. Moreover, as shown in FIG. 3, the pixel electrode 30 is disposed on an interlayer insulating film 46, which is provided so as to cover the TFT 5, the Cs counter electrode 22, and the like. For example, the pixel electrode 30 is made of a transparent conductive film of ITO (Indium Tin Oxide), IZO (Indium Zinc Oxide), or the like. Moreover, an alignment film 48 for controlling the alignment of liquid crystal molecules may be provided on the pixel electrode 30.

The plurality of gate bus lines 10 and the plurality of source bus lines 20 are connected, respectively, to a scanning line driving circuit and a signal line driving circuit not shown herein, which are controlled by a control circuit. Scanning signals (or gate signals) for switching the TFTs 5 ON or OFF are supplied from the scanning line driving circuit to the gate bus lines 10. Moreover, display signals (or source signals) are supplied from the signal line driving circuit to the plurality of signal lines 20. Based on the display signals which are supplied on the signal lines 20, voltages to be applied to the pixel electrode 30 are determined.

Hereinafter, production steps for the TFT substrate 100 will be described with reference to FIG. 3.

First, on a transparent substrate 40 of glass or the like, gate bus lines 10 and Cs bus lines 12 are provided. These can be formed by, for example, vapor-depositing on the substrate 40 an Al film, a Cu film, an Mo film, a Ti film, a Cr film, or the like, or an alloy film or multilayer metal film thereof (a Ti—Al—Ti film or an Mo—Al film), and patterning them by using a photolithography technique.

Next, the gate insulating film 42 is formed by depositing an SiNx film, an SiOx film, or the like by a CVD technique or the like. The thickness of the gate insulating film 42 is 0.3 to 0.7 μm, for example. Thereafter, the semiconductor layer 44 of an amorphous silicon (a-Si) or the like is provided in island shapes, at least in regions forming the TFTs 5. Moreover, in portions of the semiconductor layer 44 corresponding to source electrodes and drain electrodes, an n$^+$ amorphous silicon film which is doped with phosphorus is provided. A channel protection film (not shown) of SiNx or the like may be provided on the semiconductor layer 44.

Next, source bus lines 20, source electrodes 20a, drain electrodes 24, and Cs counter electrodes 22 extending from the drain electrodes 24 are formed. These can be formed by, for example, vapor-depositing an Al film, a Cu film, an Mo film, a Ti film, a Cr film, or the like, an alloy film or multilayer metal film thereof (an Mo—Al—Mo film or a Ti—Al film), or the like, and patterning them by using a photolithography technique.

When thus forming the drain electrodes 24 and the Cs counter electrodes 22 through patterning, misalignment may occur depending on the patterning precision or the like. Hereinafter, a problem occurring when misalignment exists between a Cs bus line 12 and a Cs counter electrode 22 will be described.

Figure 4:
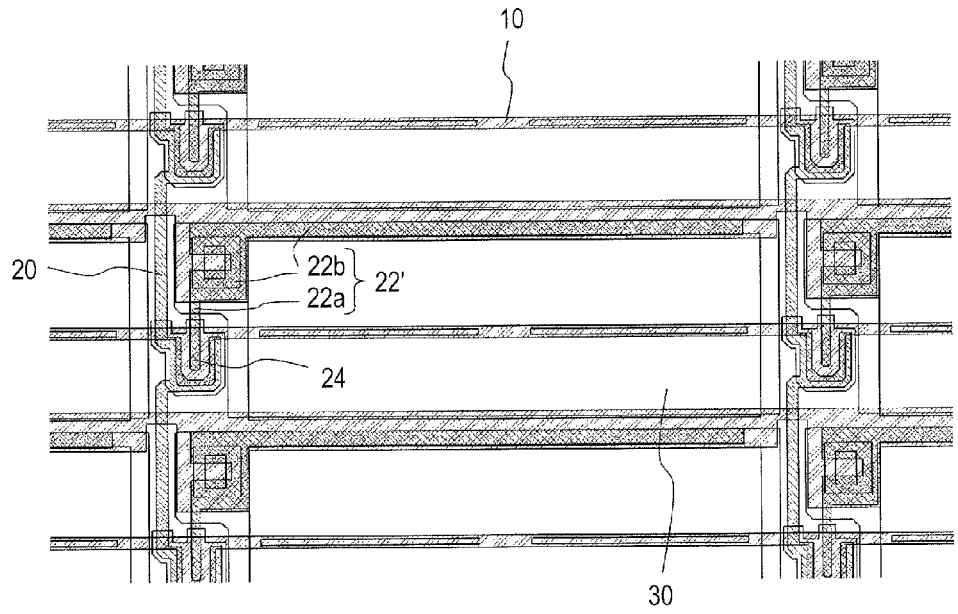
[FIG. 4] A plan view showing a TFT substrate according to Comparative Example.

FIG. 4 shows a case where, unlike the embodiment illustrated in FIG. 1 to FIG. 3, the Cs counter electrode 22 does not have a compensation portion 22c protruding from the capacitive portion 22b to create a substantial storage capacitance (Comparative Example). As can be seen from FIG. 4, in the case of a Cs counter electrode 22' lacking a compensation portion 22c, for example, if a deviation from the alignment of the Cs counter electrode 22' occurs in the upper direction in the plane of the figure, a greater part of the connecting portion 22a will overlap with the Cs bus line 12, in accordance with the magnitude of deviation. As a result, the storage capacitance is increased. If a deviation from alignment occurs in the lower direction in the plane of the figure, the storage capacitance is decreased.

Thus, in a construction lacking the compensation portion 22c, the storage capacitance fluctuates with misalignment. For example, in a step of patterning the source electrodes, the drain electrodes, and the like, different amounts of misalignment may be induced in different exposed regions when conducting split exposure, under a method of performing exposure for one display region by a step-and-repeat technique using a plurality of photomasks or a single photomask, or under a method of performing a plurality of times of scanning exposure by using a plurality of photomasks or a single photomask, etc. In this case, corresponding to the shapes of the exposed regions, regions of different storage capacitance sizes will be formed in block or strip shapes. In the case of not conducting split exposure, too, rotary-type misalignments may occur. In the case of scanning exposure, deviations in position may occur during a move of the substrate stage, the light source, or the like. In such cases, regions with stepwise or local differences in storage capacitance sizes will be formed. When storage capacitances that are associated with different pixels differ in size in such manners, the display quality of a liquid crystal panel will be deteriorated.

On the other hand, in the case where the compensation portion 22c is provided as in the present embodiment, fluctuations in storage capacitance are suppressed even when a misalignment occurs. This is because the connecting portion 22a and the compensation portion 22c are disposed opposite from each other with the capacitive portion 22b sandwiched therebetween, and that, typically, the compensation portion 22c is formed so as to override the Cs bus line 12, into a region where it no longer overlaps the Cs bus line 12.

More specifically, if a misalignment occurs in the upper direction of the figure such that an overlap at the connecting portion 22a increases, the overlap of the compensation portion 22c will decrease to suppress fluctuations in storage capacitance. Conversely, if a misalignment occurs such that an overlap at the connecting portion 22a decreases, the overlap of the compensation portion 22c will increase to suppress fluctuations in storage capacitance. Thus, irrespective of misalignment occurrences, a predetermined storage capacitance can be stably obtained.

In the present embodiment, the compensation portion 22c of the Cs counter electrode 22 is formed so as to override the Cs bus line 12. Intersecting the edge of the Cs bus line 12 has hitherto been believed undesirable because a leak current becomes more likely to occur at that portion. Therefore, conventionally, the Cs counter electrode has often been formed on the inside of the edge of the Cs bus line (e.g., Patent Document 1). Moreover, the tapered shape of the edge portion of the Cs bus line affects the surface configuration of the gate insulating film and the Cs counter electrode overlying that edge portion. In particular, when Al or the like with a high reflectance is used to form the surface of the Cs counter electrode, external light is likely to be reflected; therefore, if the tapered shape of the edge portion of the Cs bus line varies within the display region, it may be visually recognized as reflection unevenness. Therefore, for the purpose of suppressing unevenness of external light reflection, too, it has been believed desirable to form the Cs counter electrode as much inside the edge of the Cs bus line as possible.

However, by providing the compensation portion 22c of the Cs counter electrode so as to straddle the edge of the Cs bus line 12 as described above, fluctuations in storage capacitance due to a misalignment can be favorably suppressed. Therefore, in the present embodiment, the compensation portion 22c is intentionally provided so as to intersect the edge portion of the Cs bus line 12.

Thus, after allowing the storage capacitor counter electrode 22 including the compensation portion 22c to be integrally formed as an extension of the drain electrode 24, the pixel electrode 30 is formed, via the interlayer insulating film 46 and the like. In the present embodiment, the pixel electrode 30 and the drain electrode 24 are electrically connected via the contact hole 26 made in the capacitive portion 22b of the Cs counter electrode 22.

Figure 5:
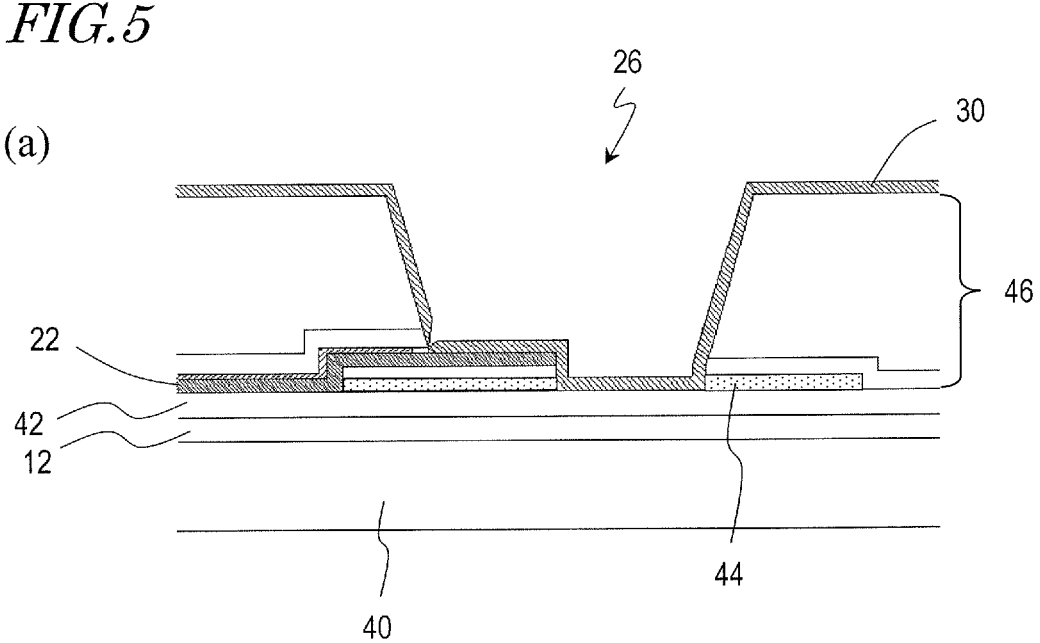
[FIG. 5] Cross-sectional views showing a contact hole along line X-X' in FIG. 2, where (a) and (b) show different implementations.
Figure 5:
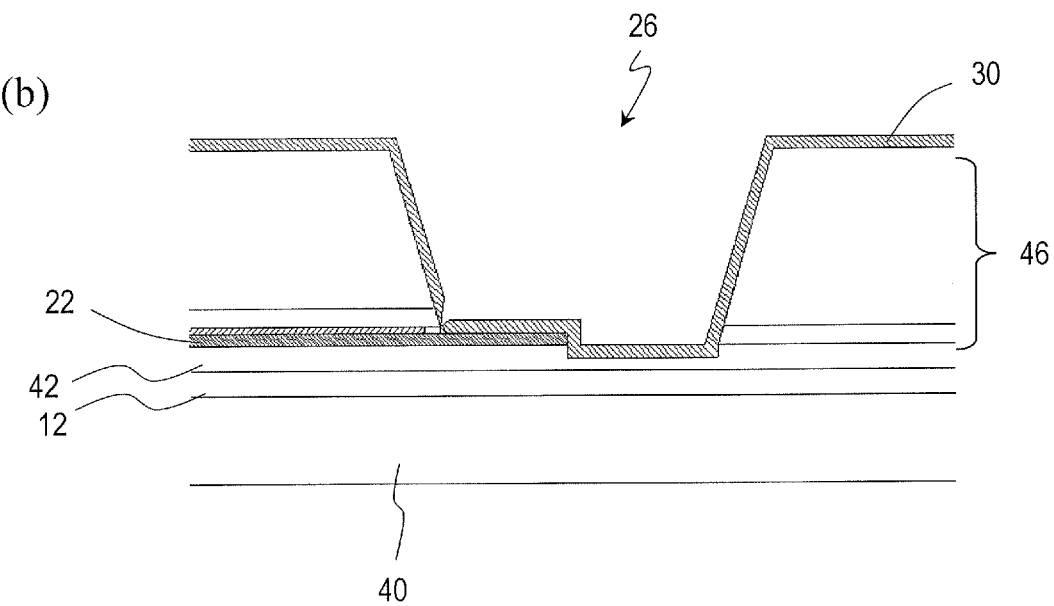

FIGS. 5(a) and (b) show a cross-sectional structure of the contact hole 26, which are cross-sectional views along line X-X' in FIG. 2. As shown in the figure, on the substrate 40, the Cs bus line 12 is provided, and the Cs counter electrode 22 is provided via the gate insulating film (e.g., having a thickness of 0.3 μm to 0.7 μm) of SiNx or the like. The Cs counter electrode 22 is formed integrally with the drain electrode 24 of the TFT 5, so that its potential changes in accordance with a source signal. FIG. 5(a) shows a case where the semiconductor layer 44 exists between the Cs counter electrode 22 and the gate insulating film 42, and FIG. 5(b) exists a case where no semiconductor layer 44 exists; however, either construction may be adopted.

The Cs counter electrode 22 is electrically connected with the pixel electrode 30 via the contact hole 26 made in the interlayer insulating film 46. Note that the interlayer insulating film 46 may be composed of two layers, e.g., an inorganic film (SiNx, SiOx, or the like) with a thickness of 0.1 to 0.7 μm and an organic film (a photosensitive acrylic resin or the like) with a thickness of to 4 μm provided thereon. Moreover, in a construction lacking the semiconductor layer as shown in FIG. 5(b), a part of the gate insulating film 42 may be made thin during a contact hole formation step (etching step).

Referring back to FIG. 2, a more specific construction of the Cs counter electrode 22 will be described.

In the present embodiment, the compensation portion 22c for compensating storage capacitance is defined by substantially the same width (about 4 μm) as that of the connecting portion 22a (in particular its portion overriding the Cs bus line 12). In this manner, when a misalignment occurs, an increase in the area of overlap with the Cs bus line 12 at the overriding portion of the connecting portion 22a becomes equivalent to a decrease in the area of overlap at the compensation portion 22c, thereby favorably compensating the storage capacitance.

Moreover, the length of the protruding portion of the compensation portion 22c is preferably about 1 μm or more, in order to take into consideration the magnitude of expected misalignments. However, as can be seen from the figures, the compensation portion 22c extends toward the TFT of an adjacent pixel; therefore, if its protruding portion is too long, short-circuiting with the TFT 5 may possibly occur. From this perspective, it is preferable that the length of the compensation portion 22c is just as long as necessary. The length of the compensation portion 22c protruding from the Cs bus line 12 may be set to about 2 μm, for example. However, when a misalignment actually occurs, the protruding portion of the compensation portion 22c will vary in length on the TFT substrate 100.

In the present embodiment, the pixel electrode 30 has a recessed portion 30n above the TFT 5, thereby preventing overlap between the pixel electrode 30 and any compensation portion 22c. If there is an overlap between them, a parasitic capacitance will be created between the compensation portion 22c and the pixel electrode 30, thus possibly unfavorably affecting the displaying by the adjacent pixel. As this parasitic capacitance increases, the potential of a given pixel electrode exerts a greater influence on the potential of an adjacent pixel electrode.

For example, consider adopting a driving method which inverts the polarity of the voltage to be applied to a given pixel for every three gate bus lines. If the aforementioned parasitic capacitance is large, at the pixels which are driven by the two outer gate bus lines among the three gate bus lines, the voltage applied across the liquid crystal layer will be influenced by voltages of different polarities from the adjacent pixels. This induces problematic differences from the voltage applied across the liquid crystal layer at the pixel which is driven by the middle gate bus line. Especially in an implementation where color filters of the three primary colors (RGB) are arranged along the vertical direction as in the present embodiment, the fact that different applied voltages are retained by respective pixels which are controlled to receive the same voltage may cause a problem because a gray intermediate level may be tinted in a specific color. According to the present embodiment, the pixel electrode 30 being recessed above the compensation portion 22c suppresses such a defect.

Moreover, in the presence of the aforementioned misalignment, e.g., if a deviation occurs in the upper direction in the figure, the drain electrode 24 will be deviated in the upper direction with respect to the gate electrode 10a of the TFT 5. In this case, the parasitic capacitance Cgd between the gate electrode and the drain electrode will be decreased. If the parasitic capacitance Cgd fluctuates in this manner, so that there exists variation in parasitic capacitance Cgd from pixel to pixel, displaying problems such as flickering and display unevenness may be caused. Hereinafter, the influences caused by fluctuations in parasitic capacitance Cgd will be described.

The size of Cgd relative to the total capacitance (liquid crystal capacitor (Clc)+Ccs+Cgd+other parasitic capacitances) of a given pixel affects the level of a drop in potential (feed-through) of the pixel electrode when a selected-period of the TFT is ended. The level of this drop in potential is referred to as a feed-through voltage. If the level of feed-through voltage differs from pixel to pixel, the display quality may be deteriorated.

The feed-through voltage ΔVd may be expressed by the equation ΔVd=Cgd·(Vgh−Vgl)/(Clc+Ccs+Cgd+α). Herein, (Vgh−Vgl) is a difference (gate voltage amplitude) between a scanning voltage (Vgh) when the TFT is ON and a scanning voltage (Vgl) when the TFT is OFF. α is other parasitic capacitances, including a parasitic capacitance between the source bus line and the pixel electrode, for example. It can be seen from the above equation that, in order to ensure a constant feed-through voltage ΔVd, the storage capacitance Ccs should preferably decrease when Cgd decreases, and that the storage capacitance Ccs should preferably increase when Cgd increases.

In the case where the direction of protrusion of the drain electrode 24 toward the gate electrode 10a and the direction of protrusion of the connecting portion 22a of the Cs counter electrode 22 toward the Cs bus line 12 are opposite directions, the level of the feed-through voltage will be different depending on whether there exists the compensation portion 22c or not. When the compensation portion 22c is not provided, if a misalignment of the drain electrode occurs in the opposite direction from the gate electrode, Cgd will decrease while Ccs will increase. Therefore, the feed-through voltage Δ Vd will greatly decrease. If a misalignment occurs in the opposite direction of the above, Cgd will increase while Ccs will decrease, and therefore the feed-through voltage Δ Vd will greatly increase.

On the other hand, when the compensation portion 22c is provided, fluctuations in storage capacitance Ccs are suppressed even if a misalignment occurs so that the parasitic capacitance Cgd decreases or increases. Therefore, fluctuations in feed-through voltage are reduced as compared to the case where the compensation portion 22c is not provided.

Figure 6:
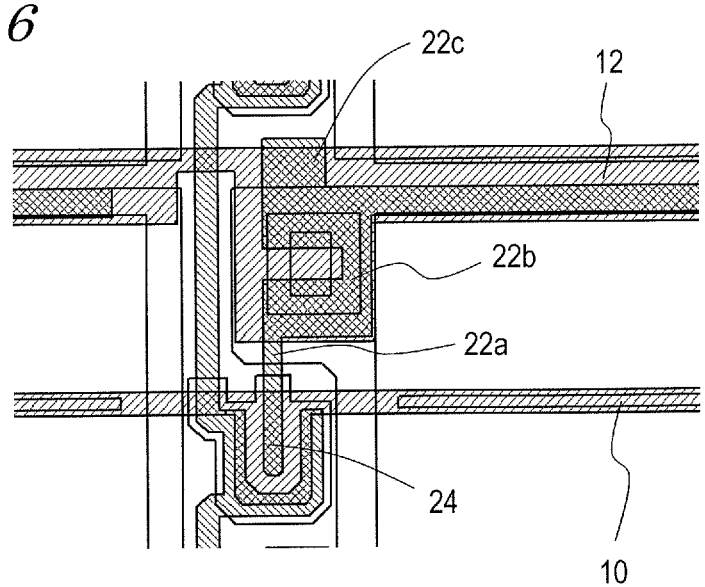
[FIG. 6] Plan views showing a variant of the TFT substrate of Embodiment 1, where (a) and (b) show different implementations.
Figure 6:
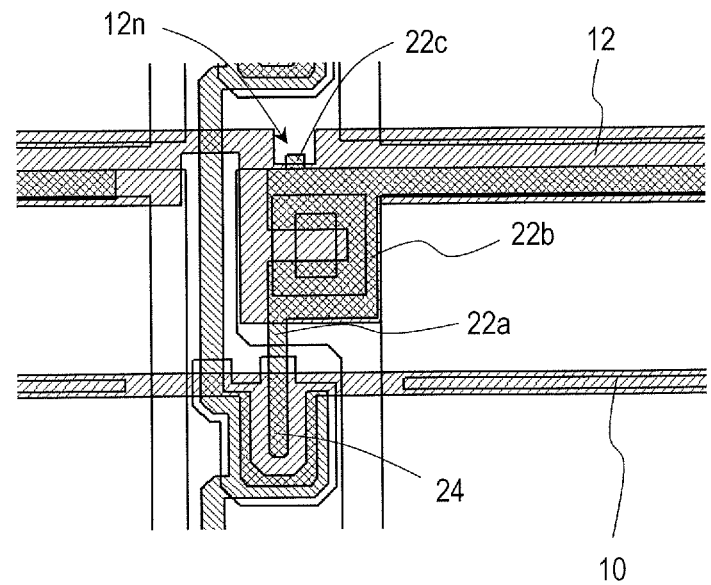

In order to more effectively suppress fluctuations in feed-through voltage, as shown in FIG. 6(a), the compensation portion 22c may be made thicker than the connecting portion (overriding portion) 22a. By making the width of the compensation portion 22c thicker than the width of the overriding portion of the connecting portion 22a on the Cs bus line 12, fluctuations in feed-through voltage caused by Cgd fluctuations can be compensated for with greater certainty because, if a misalignment occurs so that Cgd decreases, Ccs will similarly decrease, and if a misalignment occurs so that Cgd increases, Ccs will similarly increase. In order to suppress fluctuations in feed-through voltage, in the example shown in FIG. 6(a), for example, the width of the connecting portion 22a is set to about 4 μm, whereas the width of the compensation portion 22c is set to about 14 μm.

Moreover, as shown in FIG. 6(b), in the region where the compensation portion 22c is provided, the Cs bus line 12 may be partially recessed, thereby providing a recessed portion 12n of about 9 μm (horizontal)×about 7.5 μm (vertical), for example. By doing so, it becomes easier to provide the compensation portion 22c in such a manner that the compensation portion 22c is not located near the TFT 5 of an adjacent pixel. As described above, to take into consideration the magnitude of misalignment, it suffices if the compensation portion 22c protrudes from the Cs bus line 12 by about several microns. Therefore, the recessed portion 12n makes it possible to introduce a relatively long distance between the compensation portion 22c and the TFT 5 of an adjacent pixel, thus preventing current leakage and improving the production yield.

As described above, with the TFT substrate 100 of the present embodiment, it is possible to stably obtain a predetermined storage capacitance even if a misalignment occurs. Good displaying can be achieved by using the TFT substrate 100 thus constructed for a liquid crystal display device.

Note that a liquid crystal display device can be produced by sealing a liquid crystal layer in between the TFT substrate 100 and a counter substrate. Known techniques can be employed as a method for producing such a liquid crystal display device. For example, in a liquid crystal display device operating in the TN mode or the VA (Vertical Alignment) mode, or the like, a counter electrode is provided on a counter substrate, and a pixel electrode and the counter electrode are utilized to apply a voltage across a liquid crystal layer existing therebetween in a pixel-by-pixel manner, thereby conducting displaying.

Moreover, color filters and a BM (black matrix) are typically provided on the counter substrate. FIG. 2 shows regions in which the BM exists on the counter substrate. Generally, the black matrix is formed on a surface of the counter substrate facing the liquid crystal layer, by using a metal layer or a black resin layer.

In the present embodiment, the compensation portion 22c of the storage capacitor counter electrode 22 is provided at a position corresponding to where the BM is disposed on the counter substrate. Therefore, no unevenness of external light reflection that is associated with the compensation portion 22c will be visually recognized. This BM is there to shade the TFT 5 from external light, and so on, and by no means an addition that is introduced for the purpose of preventing light leakage in the aforementioned recessed portion 30n of the pixel electrode, or shading the compensation portion 22c. Thus, the same BM that has always been provided in conventional liquid crystal display devices is being utilized, without lowering the pixel aperture ratio.

<Embodiment 2>

Figure 7:
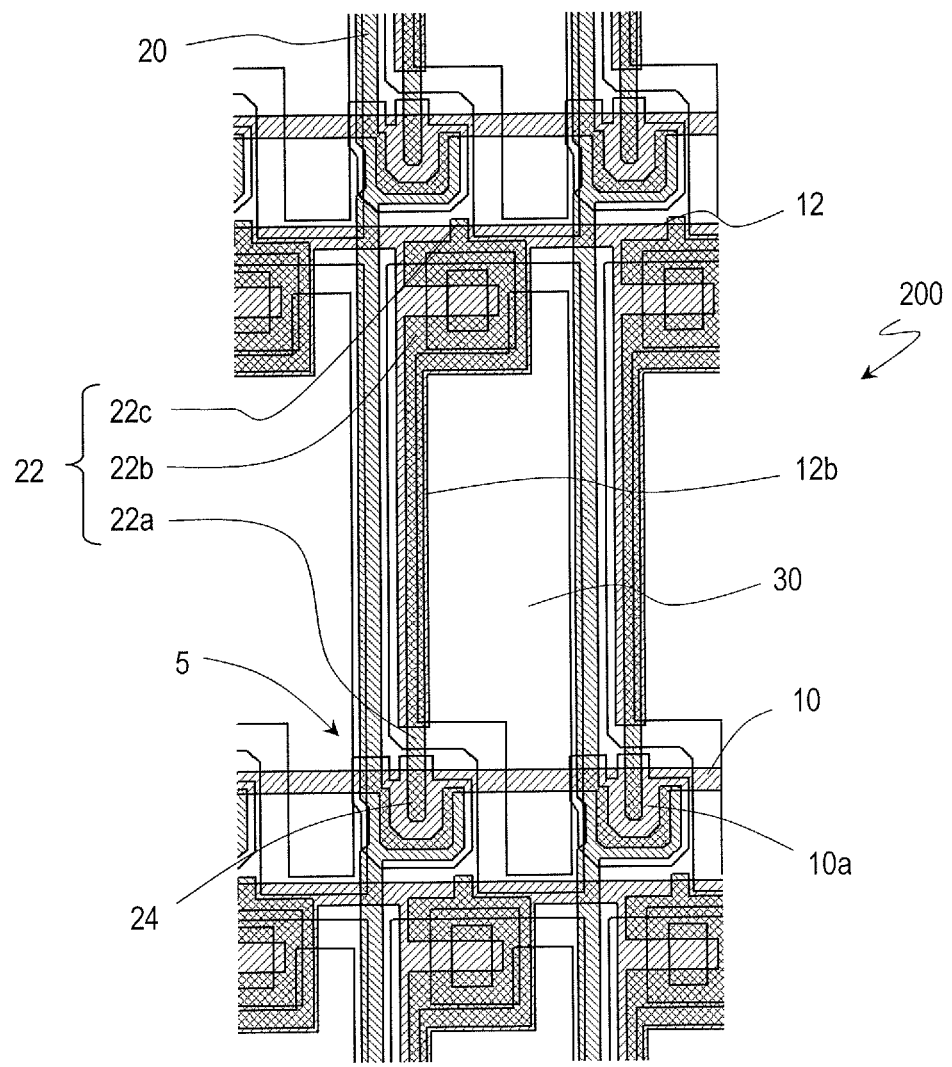
[FIG. 7] A plan view showing a TFT substrate of Embodiment 2.
Figure 8:
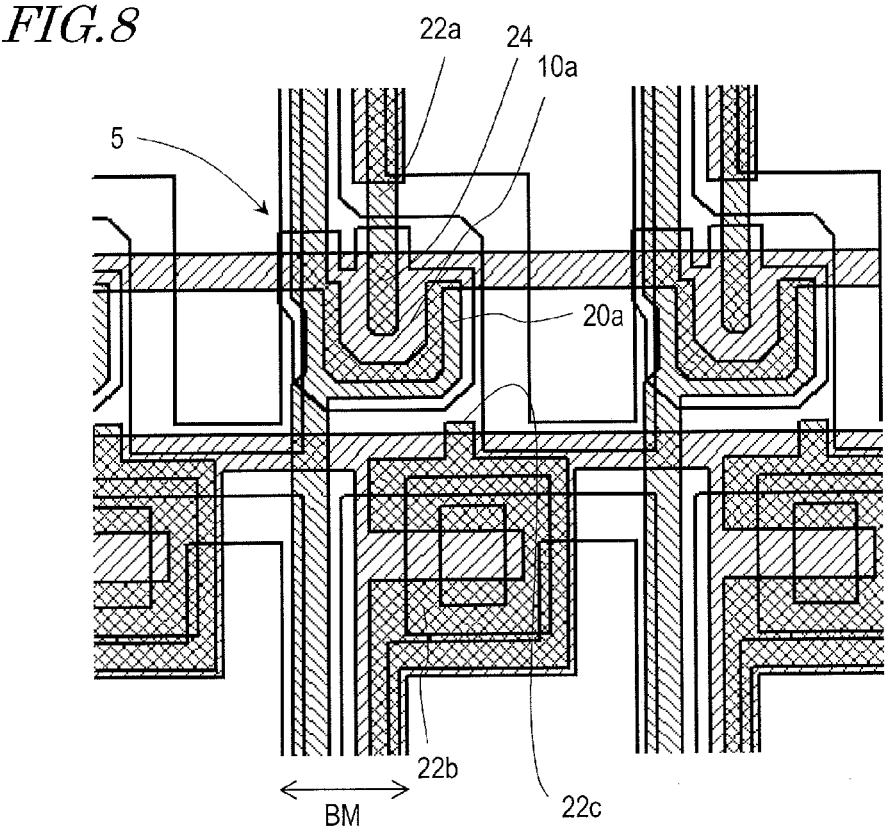
[FIG. 8] An enlarged partial view showing the neighborhood of a TFT in FIG. 7.

FIG. 7 and FIG. 8 show a TFT substrate 200 according to Embodiment 2. A large difference of the TFT substrate 200 of the present embodiment from the TFT substrate 100 of Embodiment 1 is that the pixel (and the pixel electrode) has a shape which is longer from top to bottom than from side to side. Also in Embodiment 2, the pixel size is about 50 μm×about 150 μm, which is relatively small. For simplicity, component elements having similar functions to those of the component elements of the TFT substrate 100 of Embodiment 1 will be denoted by like reference numerals, with their descriptions being omitted.

As shown in FIG. 7, in Embodiment 2, a branch portion 12b of a Cs bus line 12 extends along a source bus line 20, and overlaps a Cs counter electrode 22 which is formed as an extension of a drain electrode 24, thereby creating a storage capacitance Ccs.

Along the direction in which the source bus line 20 extends, a compensation portion 22c is not aligned with the connecting portion 22a, but is offset away from the source bus line 20. By thus ensuring that the compensation portion 22c is as distant from the TFT 5 of an adjacent pixel as possible, interference with the TFT 5 is suppressed.

Note that the compensation portion 22c being farther away from the TFT 5 of an adjacent pixel means the distance between the compensation portion 22c and a pixel electrode 30 being shorter. However, the present embodiment features a stripe pixel construction which is longer from top to bottom than from side to side, and, unlike in Embodiment 1, adjacent pixels above and below do not correspond to different colors. Furthermore, rather than a driving method of inverting the polarity of voltage to be applied to a pixel for every three gate bus lines, a driving method of alternately inverting polarity for adjacent pixels above and below is adopted. Therefore, even if the parasitic capacitance between the compensation portion 22c and the pixel electrode 30 slightly increases, the problematic tinting of a gray intermediate level into a specific color will not be observed.

In the present embodiment, too, the compensation portion 22c is provided so that fluctuations in storage capacitance can be suppressed even when a misalignment occurs. As described earlier, the compensation portion 22c does not need to be aligned with the connecting portion 22a, but these are opposite from each other with the capacitive portion 22b sandwiched therebetween. With this arrangement, an appropriate capacitive compensation with respect to misalignment is realized.

Compensation of storage capacitance becomes more important as the pixel size becomes smaller. There are limits to the resolution of pattern formation in a photolithography step, and to the minimum line width of photomasks; the minimum line width is approximately 3 μm as a design value. Therefore, even if the pixel size decreases (i.e., even if the storage capacitance decreases), the width of the overriding portion of the connecting portion 22a cannot be made proportionally narrower. Moreover, the magnitude of misalignment is the same irrespective of the pixel size. Therefore, the relative amount of change in storage capacitance with respect to the total capacitance of the storage capacitance increases as the pixel size decreases.

Moreover, the compensation portion 22c may be utilized for purposes other than capacitive compensation. For example, the length of the compensation portion 22c protruding beyond the Cs bus line 12 may be measured, and the magnitude of misalignment can be measured by comparing this measured value against a setting value. By adjusting the production process so as to reduce this deviation, it becomes possible to reduce the misalignment itself.

Figure 9:
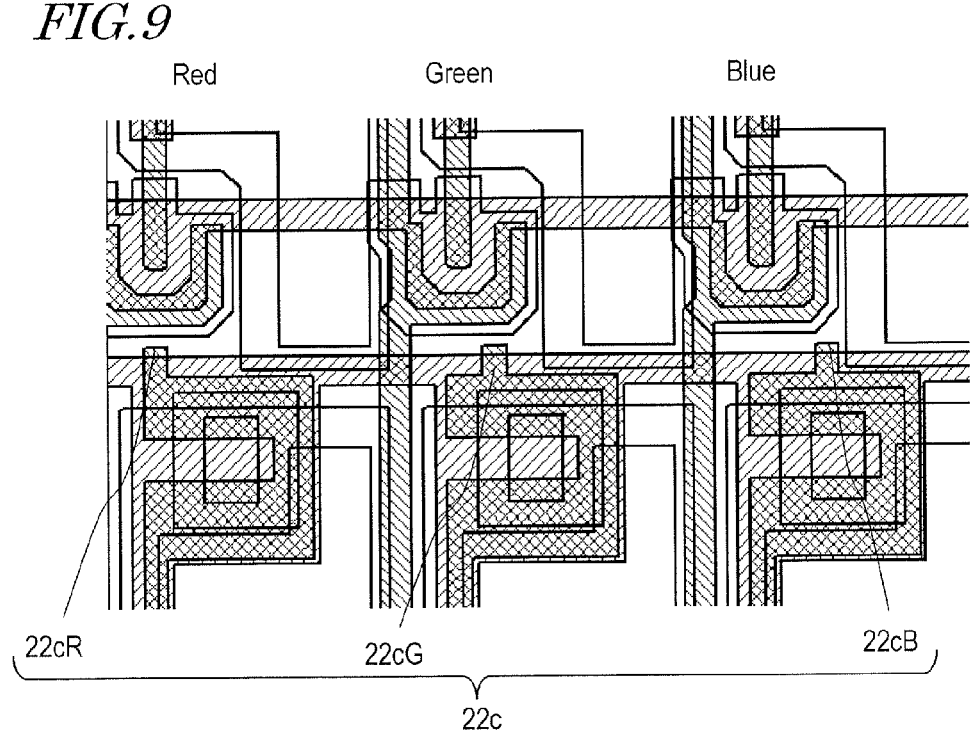
[FIG. 9] A plan view showing a variant of the TFT substrate of Embodiment 2.

Moreover, as shown in FIG. 9, the position of the compensation portion 22c may be changed from pixel to pixel, in which case the compensation portion 22c can be utilized as a marker indicating a specific pixel. In the implementation shown in FIG. 9, three pixels adjacent along the horizontal direction are associated with the respective colors of RGB (Red, Green, Blue). These three pixels respectively correspond to the colors of the color filters which are typically provided on the counter substrate.

In this case, in association with each color, a compensation portion 22cR is provided for an R pixel, a compensation portion 22cG for a G pixel, and a compensation portion 22cB for a B pixel. The positioning of the compensation portion 22cR, 22cG, or 22cB within the pixel differs for each pixel (color). By doing this, on the TFT substrate prior to being attached together with the counter substrate, it is easy to identify which color is liable to defects.

FIG. 9 illustrates an example where three adjacent pixels are associated with the respective colors of RGB. In the case where four adjacent pixels correspond to RGBY (Yellow), RGBW (White), etc., a similar construction would be possible where the position of the compensation portion is varied from pixel to pixel. Moreover, the pixels corresponding to the respective colors do not need to be arranged along the horizontal direction in order, but may be placed in a certain pattern. Moreover, an arrangement in which the position of the compensation portion is varied for each pixel color is applicable not only to the TFT substrate 200 of the present embodiment, but also to the TFT substrates of other embodiments.

Figure 10:
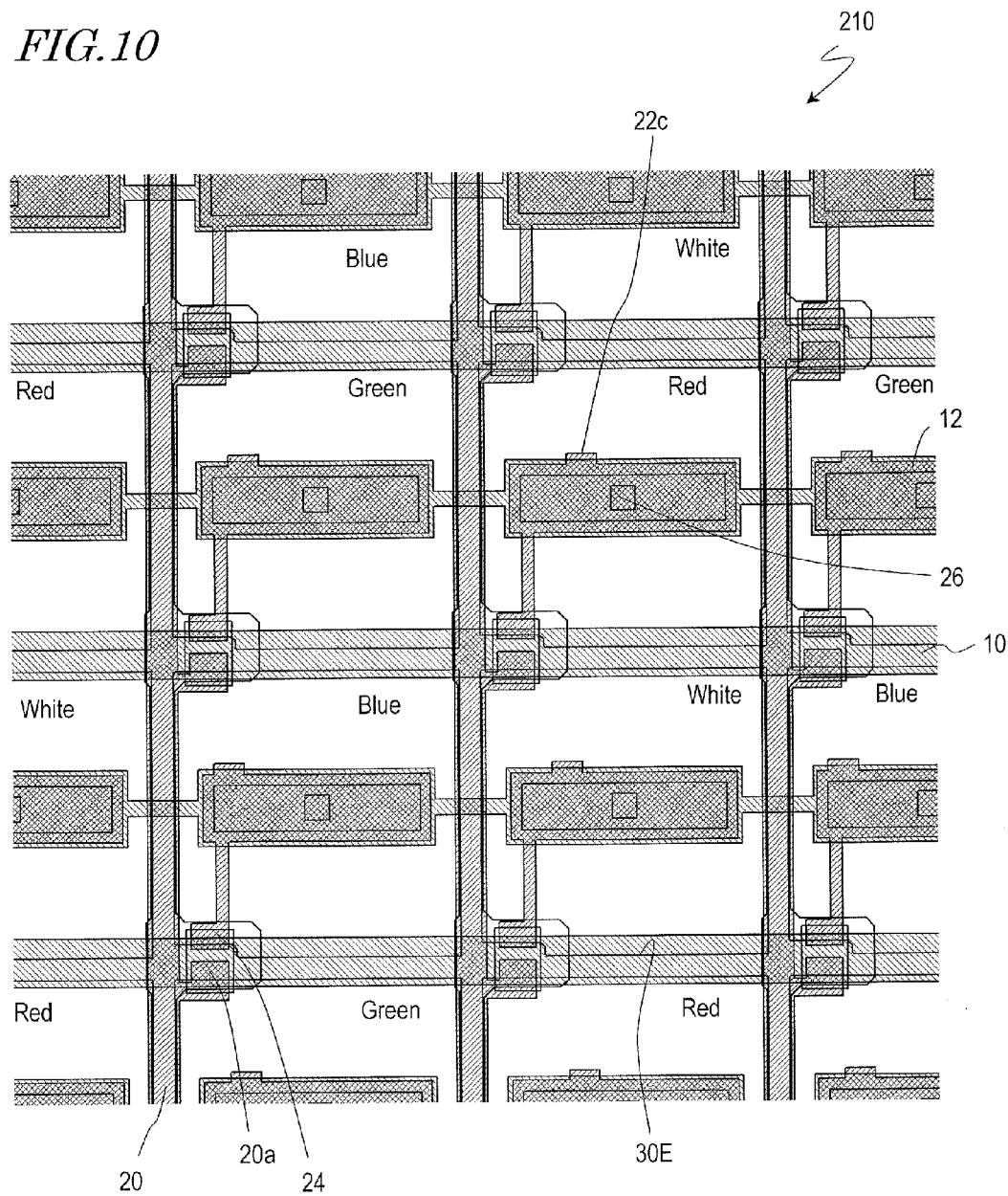
[FIG. 10] A plan view showing an implementation adapted to four-colored pixels of the TFT substrate of Embodiment 2.

FIG. 10 shows an implementation adapted to four-colored pixels. In the active matrix substrate 210 shown, pixels of a square shape of about 100 μm×about 100 μm are provided corresponding to the four colors of RGBW. The position of the compensation portion 22c within the pixel differs for each pixel color. Note that the RGBW positioning in FIG. 10 is only an example, and may arbitrarily be set. As described earlier, Y may be used instead of W, or any other color may be used.

<Embodiment 3>

Figure 11:
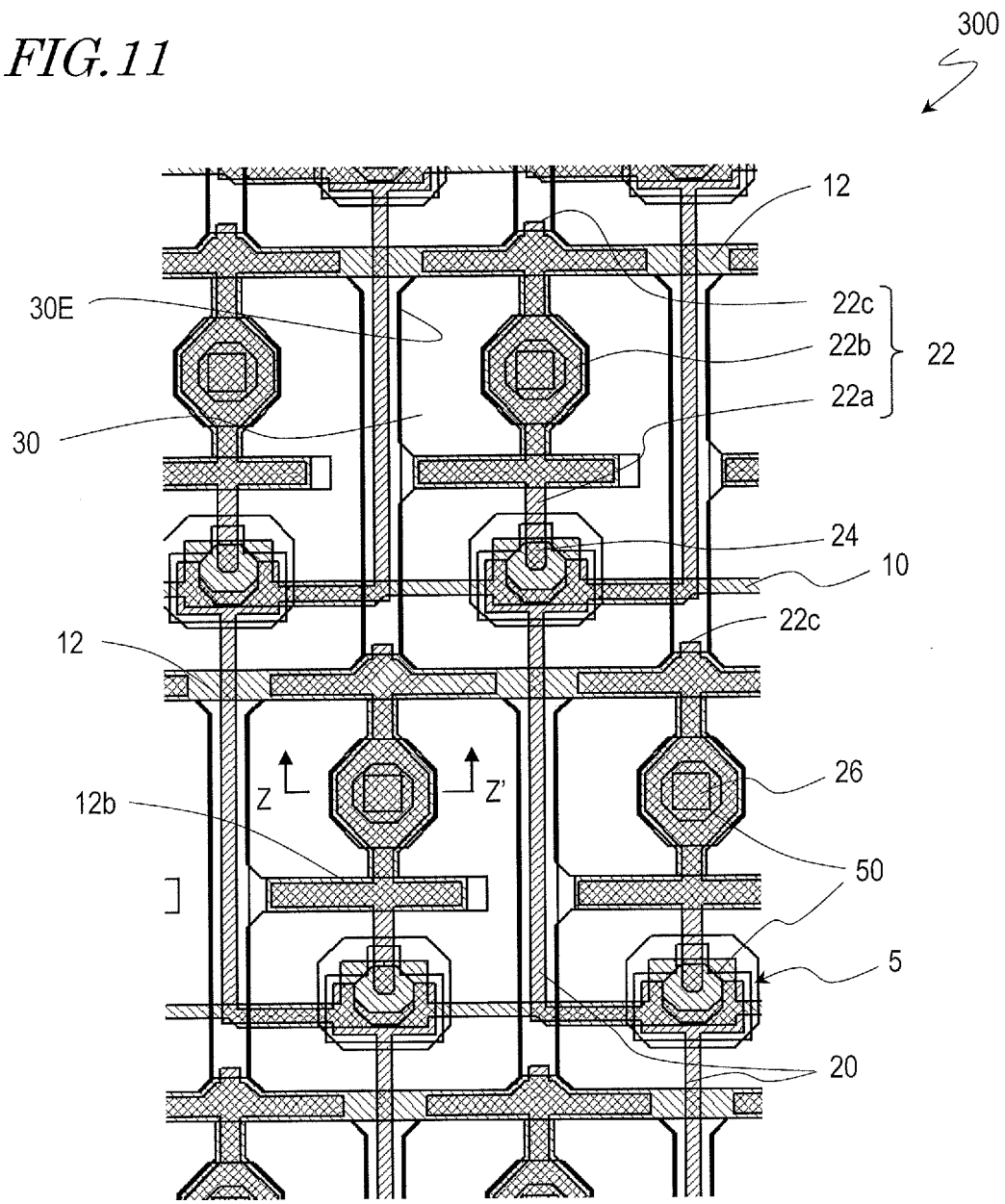
[FIG. 11] A plan view showing a TFT substrate of Embodiment 3.

FIG. 11 shows a TFT substrate 300 according to Embodiment 3. The TFT substrate 300 of the present embodiment differs from the TFT substrate 100 of Embodiment 1 in that the pixels are in a delta array, and that the TFT substrate 300 is for use in a liquid crystal display device which operates in the CPA mode, among VA modes. For simplicity, component elements having similar functions to those of the component elements of the TFT substrate 100 of Embodiment 1 will be denoted by like reference numerals, with their descriptions being omitted.

In the TFT substrate 300, a source bus line 20 extends along the vertical direction in the figure, in a rectangular wave shape having a plurality of bends, thus conforming to the pixels constituting a delta array. A Cs bus line 12 includes a branch portion 12b which extends toward the central portion of the pixel region. A storage capacitance is also created between the branch portion 12b and a capacitive portion 22b of a Cs counter electrode 22.

Moreover, in order to realize operation in the CPA mode, alignment regulating portions 50 are provided on a counter electrode (not shown) on a counter substrate (not shown) which is disposed opposite from the TFT substrate 300. FIG. 11 shows the positions of the alignment regulating portions 50 provided on the counter substrate. In the present embodiment, the alignment regulating portions 50 on the counter substrate are provided at positions corresponding to TFTs 5 and contact holes 26 on the TFT substrate 300.

Each alignment regulating portion 50 regulates the alignment direction of liquid crystal molecules in a vertical-alignment type liquid crystal layer so that, under an applied voltage, the liquid crystal molecules are radially aligned within a predetermined region around the alignment regulating portion 50. The alignment regulating portion 50 may be a protruding structure of a regular polygonal prism or cylindrical shape, for example. This protruding structure is obtained by patterning a resin film, for example, and may have a height of about 1.2 μm. Moreover, columnar photospacers which are provided in order to ensure a uniform cell gap across the entire liquid crystal panel may be utilized as these protruding structures. Furthermore, the alignment regulating portions 50 do not need to be protruding structures, but may be circular or polygonal apertures that are formed upon the counter electrode.

In the present embodiment, too, the compensation portion 22c of the Cs counter electrode 22 is provided on the opposite side from the connecting portion 22a to the drain electrode 24, with the capacitive portion 22b sandwiched therebetween. Thus, the storage capacitance is compensated even if a misalignment occurs. The compensation portion 22c preferably protrudes 1 μm or more from the Cs bus line 12. However, in order to prevent short-circuiting with other connection lines or the like, the protruding portion is desirably not too long, and in the present embodiment is set to 2 μm.

Moreover, as can be seen from the figures, in the case where pixels are in a delta array as in the TFT substrate 300, each compensation portion 22c is preferably disposed between two adjacent pixel electrodes 30. The distance between adjacent pixel electrodes is set to 7 μm in the present embodiment. By ensuring that pixel electrodes are appropriately spaced apart, current leakage between pixel electrodes, and the size of any parasitic capacitance created between pixel electrodes can be reduced. This distance is set to about 4 to 8 μm, for example.

Figure 12:
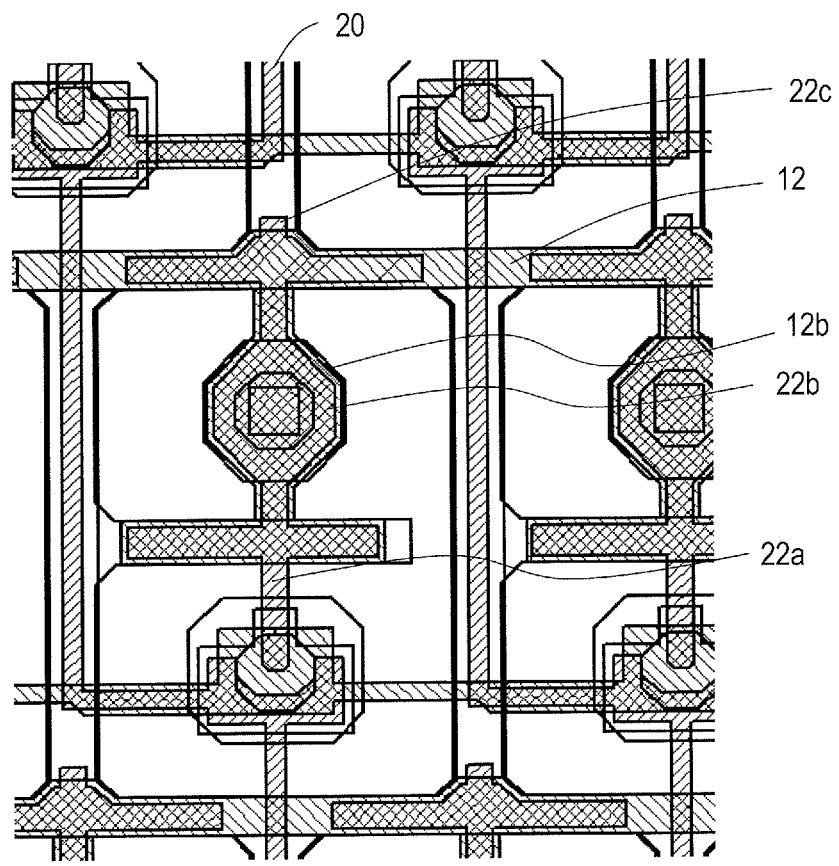
[FIG. 12] (a) is an enlarged partial view of FIG. 11, showing the neighborhood of a region corresponding to one pixel; and (b) is a cross-sectional view along line Z-Z' of the TFT substrate shown in FIG. 11.
Figure 12:
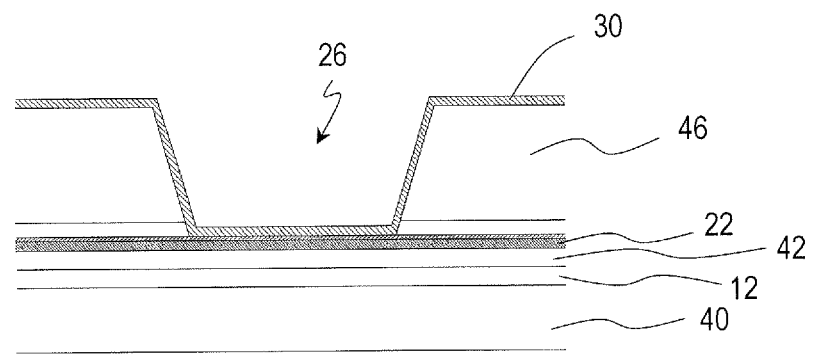

Furthermore, as shown enlarged in FIG. 12(a), the compensation portion 22c extends toward the source bus line 20; therefore, it is important to prevent a leak current from occurring between them. It is desirable that the distance between the source bus line 20 and the compensation portion 22c is 3 μm or more. In the present embodiment, this distance is set to 9 μm. The shape of the compensation portion 22c may be appropriately selected by taking various such design constraints into consideration.

In order to compensate the storage capacitance Ccs with greater certainty, it is desirable that the width of the compensation portion 22c is basically equal to or greater than the width of the connecting portion 22a. In the present embodiment, both widths are set to 4 µm. However, the width of the compensation portion 22c may be larger than this, and is set to 5 µm, for example.

As has been described above with reference to FIG. 6(a), by making the compensation portion 22c thicker, flickering, display unevenness, and the like associated with Cgd fluctuations can be suppressed even if a misalignment occurs. In the present embodiment, too, the direction of protrusion of the drain electrode 24 of the TFT 5 toward the gate electrode 10a and the direction of the connecting portion 22a of the Cs counter electrode 22 with respect to the Cs bus line 12 (overriding direction) are opposite. For example, in the case where the alignment is deviated in the upper direction in the plane of the figure, the gate-drain parasitic capacitance Cgd decreases. At this time, if the compensation portion 22c is not provided, the storage capacitance Ccs increases. As a result, the size of the parasitic capacitance Cgd relative to all capacitance that is associated with the pixel fluctuates greatly. In contrast, when a thicker compensation portion 22c is provided, the storage capacitance Ccs decreases together with the parasitic capacitance Cgd. As a result of this, fluctuations in the size of the parasitic capacitance Cgd relative to all capacitance are suppressed. However, an overlap occurring between the compensation portion 22 and the pixel electrode 30 is not preferable because a large parasitic capacitance would be created between the compensation portion 22c and the adjacent pixel electrode 30. Therefore, it is preferable that the width of the compensation portion 22c is not greater than the interspace between pixel electrodes. In the present embodiment, since the distance between pixel electrodes is the width of the compensation portion 22c is preferably 7 µm or less.

Thus, by providing the compensation portion 22c in an interspace between pixel electrodes 30, a parasitic capacitance is prevented from being created between the compensation portion 22c and the pixel electrode 30. In the present embodiment, without providing a recessed portion in the pixel electrode 30, unfavorable influences on the displaying by adjacent pixels are prevented.

Preferably, the interspace between pixel electrodes is shaded by a BM which is formed on the counter electrode. Generally, it is commonplace to provide a BM at positions corresponding to interspaces between adjacent pixel electrodes. This is in order to prevent intermixing of colors even when a deviation in position occurs in a step of attaching together the TFT substrate and the counter substrate. In the present embodiment, the CPA mode conducting display in a normally-black manner is adopted, so that no extreme light leakage as in the case of normally-white does not occur. However, since disorders in liquid crystal alignment are likely to occur at pixel ends, a BM is employed to provide an improved contrast through shading. Moreover, the poor liquid crystal responses at portions which are far from the alignment regulating portions 50 cause afterimages. Obscuring such regions with the BM serves as a countermeasure against afterimages.

FIG. 12(b) shows a cross section of the TFT substrate 300 shown in FIG. 11 along line Z-Z'. In the TFT substrate 300, the Cs counter electrode 22 and the pixel electrode 30 are connected in a contact hole 26 which is provided in an interlayer insulating film 46. As can be seen from FIG. 12(b), the Cs counter electrode 22 and the pixel electrode 30 are directly connected in the present embodiment. Note that the Cs counter electrode 22 may be formed of a multilayer structure of an electrically conductive material. For example, it may be structured so that an Al alloy film is provided on an Mo film.

<Embodiment 4>

Figure 13:
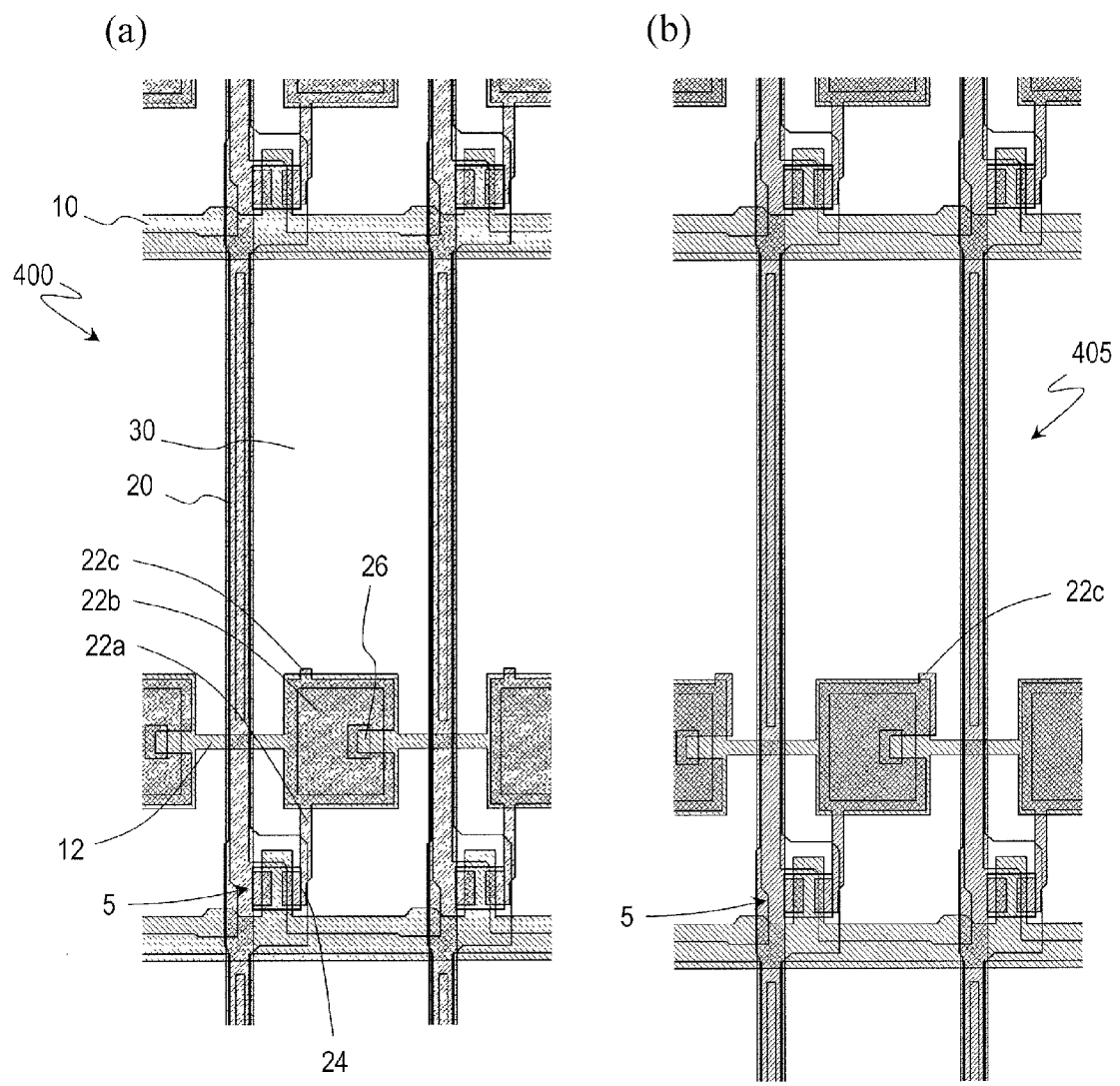
[FIG. 13] (a) is a plan view showing the TFT substrate of Embodiment 4; and (b) is a plan view showing a variant thereof.

FIG. 13(a) shows a TFT substrate 400 according to Embodiment 4. FIG. 13(b) shows a TFT substrate 405 as a variant thereof.

In the TFT substrate 400, a pixel electrode 30 is disposed corresponding to a region that is surrounded by two adjacent source bus lines 20 and two adjacent gate bus lines 10. A Cs bus line 12 provided between the gate bus lines 10 extends in a manner of traversing the pixel electrode 30. For simplicity, component elements having similar functions to those of the component elements of the TFT substrate 100 of Embodiment 1 will be denoted by like reference numerals, with their descriptions being omitted.

The compensation portion 22c of the Cs counter electrode 22 is formed so as to protrude from the Cs bus line 12. The length of protrusion is preferably 1 µm or more. However, each compensation portion 22c of the TFT substrate 400 exists in a region overlapping the pixel electrode 30, and therefore may be a cause for a lowered pixel aperture ratio or reflection unevenness. For this reason, the protruding portion should preferably not be too long, and is set to about 2 µm, for example.

Moreover, fluctuations in storage capacitance are favorably suppressed so long as the width of the compensation portion 22c is equal to the width of its overriding portion onto the Cs bus line 12 at the connecting portion 12a. In the present embodiment, these are set to 4 µm.

In the present embodiment, the pixel electrode 30 is interposed between two gate bus lines 10, and the Cs bus line 12 is formed so as to traverse the pixel electrode 30. Therefore, the voltage applied to the compensation portion 22c will not affect the potential of an adjacent pixel.

Moreover, as shown in FIG. 13(b), the compensation portion 22c may be provided at a corner of the capacitive portion 22b. The compensation portion 22c as such includes, in addition to a portion protruding in the upper direction in the figure, an additional portion protruding in the right direction in the figure. In the implementations shown in FIGS. 13(a) and (b), the direction in which the drain electrode 24 of the TFT 5 extends toward the gate electrode 10a (drain-gate direction) is the left direction in the figure. In this case, if the drain electrode 24 or the Cs counter electrode 22 has a misalignment in the right direction in the plane of the figure, for example, Cgd is decreased. At this time, if the additional portion of the compensation portion 22c is formed in the right direction, which is opposite to the drain-gate direction, as shown in FIG. 13(b), Ccs will also decrease together with Cgd, so that the fluctuation in the size of Cgd relative to the total capacitance (Clc+Ccs+Cgd+α), i.e., fluctuations in feed-through voltage, can be suppressed. Note that this additional portion does not need to be formed integrally with the compensation portion 22c, but may be separately provided.

Figure 14:
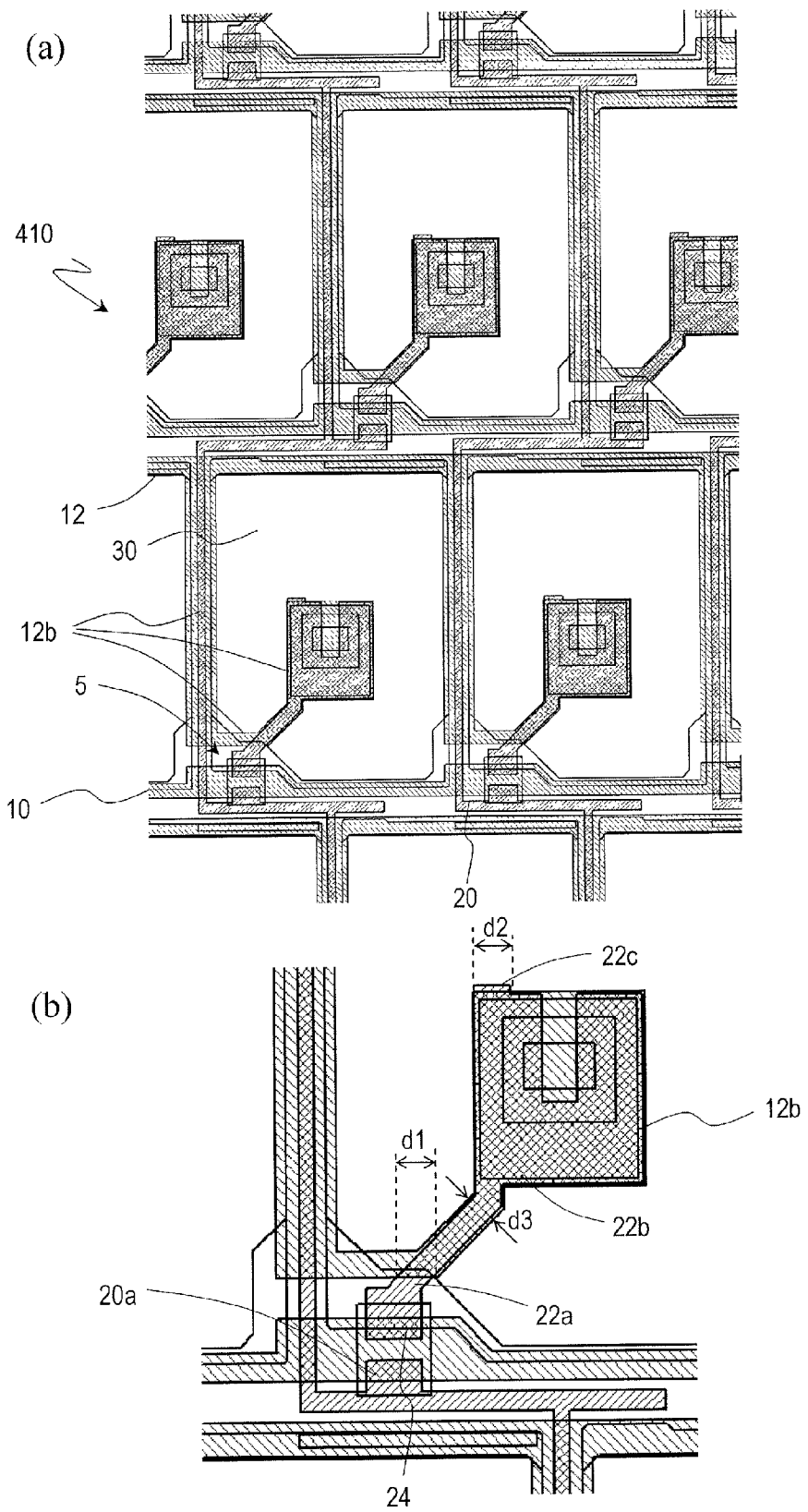
[FIG. 14] (a) and (b) are views showing another implementation of the TFT substrate of Embodiment 4, where (b) is an enlarged partial view showing the neighborhood of a TFT in (a).

FIGS. 14(a) and (b) show a TFT substrate 410 having pixels in a delta array. On the TFT substrate 410, too, a pixel electrode 30 is interposed between two adjacent gate bus lines 10. Moreover, a Cs bus line 12 includes a branch portion 12b extending into the central portion of the pixel.

The compensation portion 22c of the Cs counter electrode 22 protrudes about 1.5 µm from the branch portion 12b. Its width d2 is set basically equal to the width d1 of the overriding portion of the branch portion 12b, and is about 7 µm herein. Although the connecting portion 22a of the Cs counter electrode 22 intersects the edge of the Cs bus line (branch portion 12b) at an angle of about 45°, a surer capacitive compensation for misalignments can be achieved by setting the width d2 of the compensation portion 22c basically equal to the width d1 of the overriding portion (intersection with the edge of the branch portion 12b), rather than the line width indicated as d3 in FIG. 14(b) (about 5 μm).

<Embodiment 5>

FIGS. 15(a) and (b) shows a liquid crystal display device 500 which operates in the MVA mode. FIG. 15(a) shows component elements which are provided on a TFT substrate and a counter substrate, whereas FIG. 15(b) only shows those on the TFT substrate. A vertical-alignment type liquid crystal layer is sealed in between the TFT substrate and the counter substrate. The liquid crystal layer contains nematic liquid crystal having a negative anisotropy of dielectric constant.

Although not shown, typically, a counter electrode (common electrode), color filters, a black matrix, and the like are provided on the counter substrate. On the liquid crystal layer side of each of the counter substrate and the TFT substrate, a vertical-alignment type alignment film is provided for regulating the alignment of the liquid crystal so that the liquid crystal molecules have a substantially vertical pretilt angle.

In the present embodiment, too, a storage capacitance is created by a Cs bus line 12 (and a branch portion 12b) and a Cs counter electrode 22 on the TFT substrate. Similarly to the TFT substrates described in Embodiments 1 to 4, the Cs counter electrode 22 extending from a drain electrode 24 has a construction such that a compensation portion 22c is provided on the opposite side from a connecting portion 22a so as to sandwich its capacitive portion 22b. The compensation portion 22c compensates for fluctuations in storage capacitance that are caused by misalignment.

Moreover, strip-shaped slits 30s are formed in each pixel electrode 30 on the TFT substrate, and linear ribs 52 are provided on the counter substrate so as to extend substantially parallel to the slits 30s. The liquid crystal molecules in the liquid crystal layer interposed between the TFT substrate and the counter substrate have their alignment regulated by the ribs 52 and slits 30s, so that, typically, their alignment direction is defined perpendicular to the direction in which each rib 52 or slit 30s extends. However, the liquid crystal molecules are aligned in directions which are 180° apart on both sides of each rib 52 or slit 30s. Moreover, each slit 30s or rib 52 has portions extending in two directions orthogonal to each other within one pixel. As a result, four liquid crystal regions (liquid crystal domains) with different alignment directions are created within one pixel under an applied voltage. Thus, good viewing angle characteristics can be obtained.

Such ribs 52 and slits 30s are referred to as alignment regulating structures (domain regulating structures). In an MVA-type liquid crystal display device, slits (apertures) formed in an electrode, or dielectric protrusions (ribs) formed on the liquid crystal layer side of an electrode are usually employed as alignment regulating structures.

In the present embodiment, slits 30s are provided in the pixel electrode 30, but the pixel electrode 30 is not divided by the slits 30s. In other words, within one pixel region, the same voltage is applied to the pixel electrode 30 across the entire pixel, via a TFT 5. Moreover, since the pixel electrode 30 and the Cs counter electrode 22 are retained at substantially the same potential, no capacitor is created therebetween.

The compensation portion 22c of the Cs counter electrode 22 is provided at a position corresponding to a rib 52 on the counter substrate. The regions where the ribs 52 are provided have low transmittance, and often have different liquid crystal molecule alignments from that of any other region, and therefore are difficult to be utilized for displaying. By disposing the compensation portion 22c in such a region, the pixel aperture ratio is prevented from being further reduced from the case where the compensation portion 22c is not provided. Moreover, reflection unevenness is suppressed.

Figure 16:
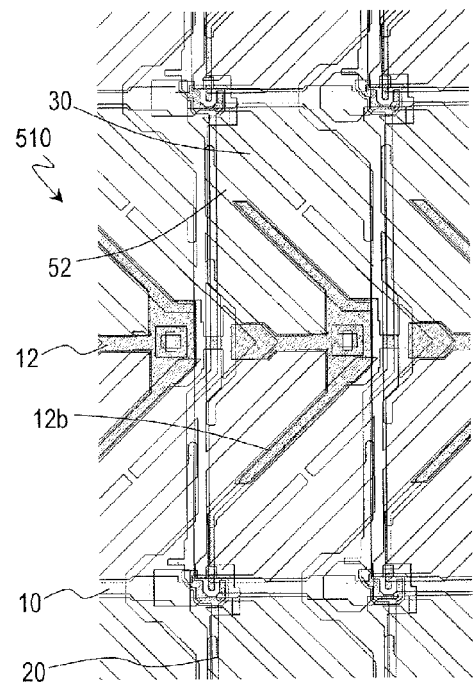
[FIG. 16] Plan views showing another implementation of the liquid crystal display device of Embodiment 5, where (a) shows a TFT substrate and a counter substrate, and (b) only shows the TFT substrate.
Figure 16:
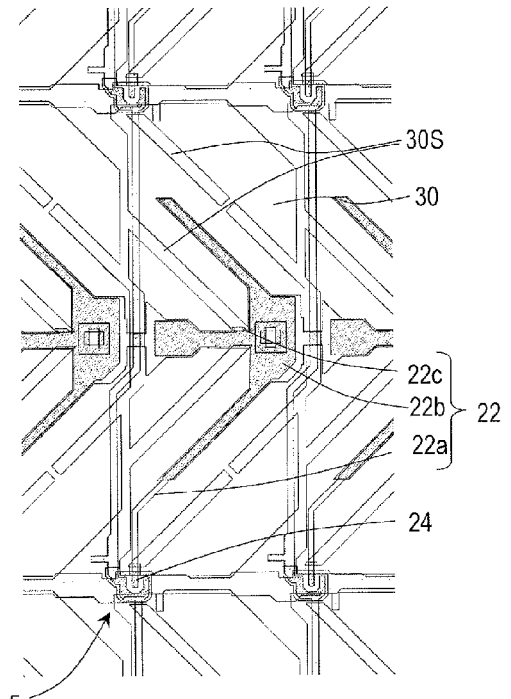

Next, with reference to FIGS. 16(a) and (b), a liquid crystal display device 510 as a variant of the liquid crystal display device 500 will be described. The liquid crystal display device 510 differs from the liquid crystal display device 500 in that the compensation portion 22c of the Cs counter electrode 22 is disposed in a slit 30s of the pixel electrode 30.

Thus, the compensation portion 22c can be provided at any arbitrary position where the compensation portion 22c sandwiches the capacitive portion 22b between the connecting portion 22a and itself. However, the compensation portion 22c needs to function to cancel out any increase or decrease in overlap due to a misalignment, at the overriding portion of the Cs counter electrode 22 onto the Cs bus line 12 (i.e., the boundary between the connecting portion 22a and the capacitive portion 22b).

For this purpose, in the present embodiment, the compensation portion 22c may protrude from the Cs bus line 12 so as to satisfy the following conditions. An A direction is designated to be an outbound normal direction from an edge of the Cs bus line 12, within its plane, at the overriding portion (i.e., the direction of a perpendicular to the edge toward where the Cs bus line 12 does not exist). Moreover, when the compensation portion 22c protrudes from another edge of the Cs bus line 12, a B direction is designated to be an outbound normal direction from that other edge, within its plane. Now, if the angle constituted by the A direction and the B direction is greater than 90°, the compensation portion 22c is able to compensate for an increase or decrease in the area of overlap at the overriding portion. In the present specification, whenever such a relationship is satisfied, it is said that "the compensation portion 22c sandwiches the capacitive portion 22b between the connecting portion 22a and itself" or "the compensation portion 22c protrudes from the capacitive portion 22b so as to be opposite from the connecting portion 22a", and so on.

Typically, the compensation portion 22c protrudes from a Cs bus line edge having an outbound normal direction (e.g., the upper direction in the figure) which is 180° apart from the outbound normal direction at the overriding portion (e.g., the lower direction in the figure). In other words, in the case where the Cs bus line edges at the connecting portion 22a and the compensation portion 22c are parallel to each other, the direction of protrusion of the Cs counter electrode 22 toward the drain electrode 24 and the direction of protrusion of the compensation portion 22c are opposite.

<Embodiment 6>

Figure 17:
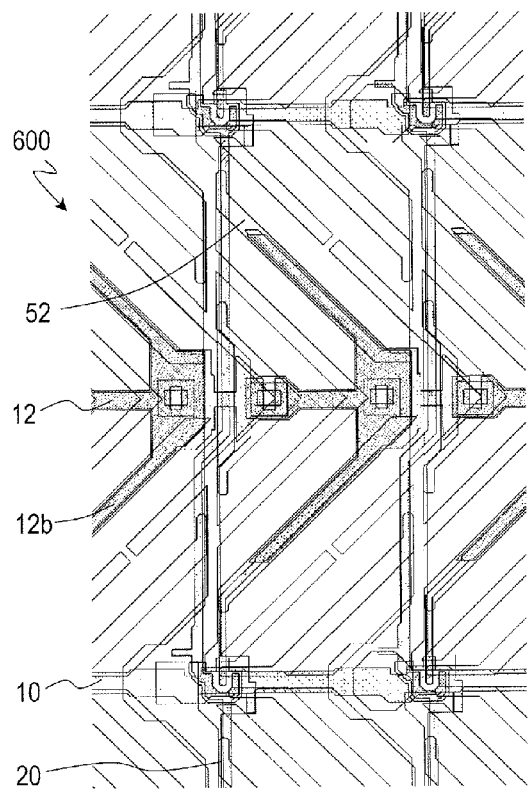
[FIG. 17] Plan views showing a liquid crystal display device of Embodiment 6 (double-divided pixel), where (a) shows a TFT substrate and a counter substrate, and (b) only shows the TFT substrate.
Figure 17:
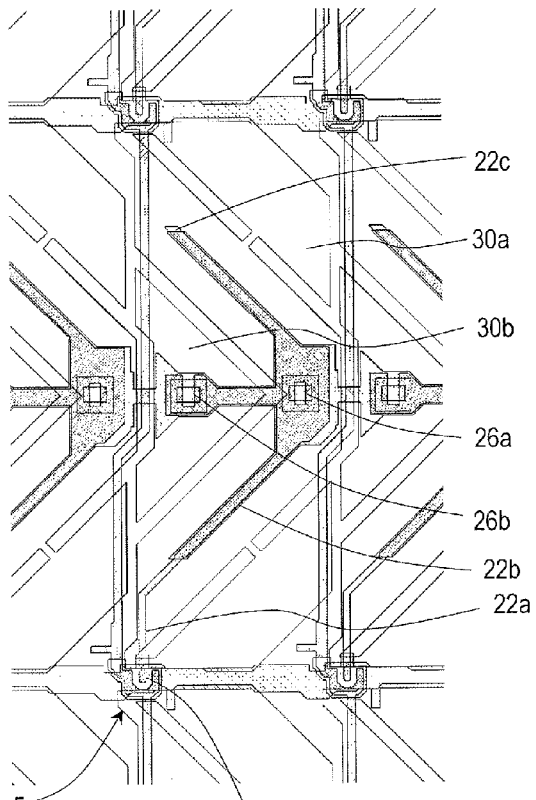

FIGS. 17(a) and (b) show a liquid crystal display device 600 of another implementation which operates in the MVA mode. In the liquid crystal display device 600 of the present embodiment, pixel division is adopted, such that a subpixel electrode 30a and a subpixel electrode 30b exist within one pixel. However, in the present embodiment, both subpixel electrodes 30a and 30b are electrically connected to a drain electrode 24 of a TFT 5, respectively via contact holes 26a and 26b.

Figure 15:
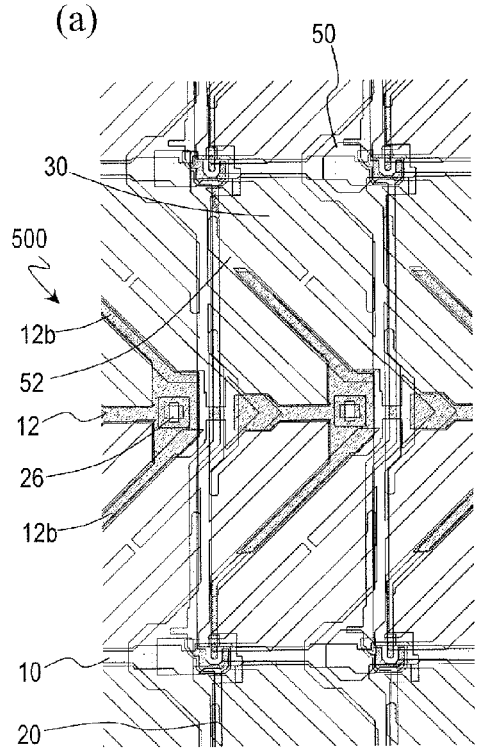
[FIG. 15] Plan views showing a liquid crystal display device of Embodiment 5, where (a) shows a TFT substrate and a counter substrate, and (b) only shows the TFT substrate.
Figure 15:
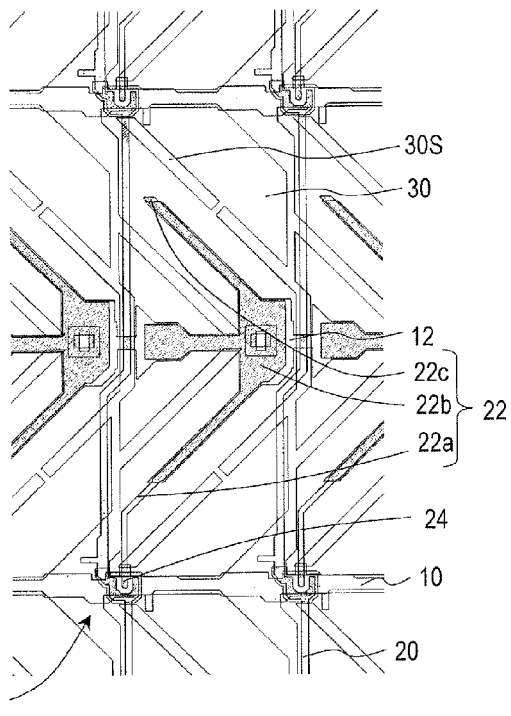

In the liquid crystal display device 600, too, a compensation portion 22c of a Cs counter electrode 22 is provided as in the liquid crystal display device 500 shown in FIG. 15, and therefore a desired storage capacitance can be obtained irrespective of occurrence of misalignments.

Moreover, the compensation portion 22c of the Cs counter electrode 22 is provided at a position corresponding to a rib 52 on the counter substrate. By disposing the compensation portion 22c in such a region, the pixel aperture ratio is prevented from being further reduced by the compensation portion 22c. Moreover, reflection unevenness is suppressed.

Figure 18:
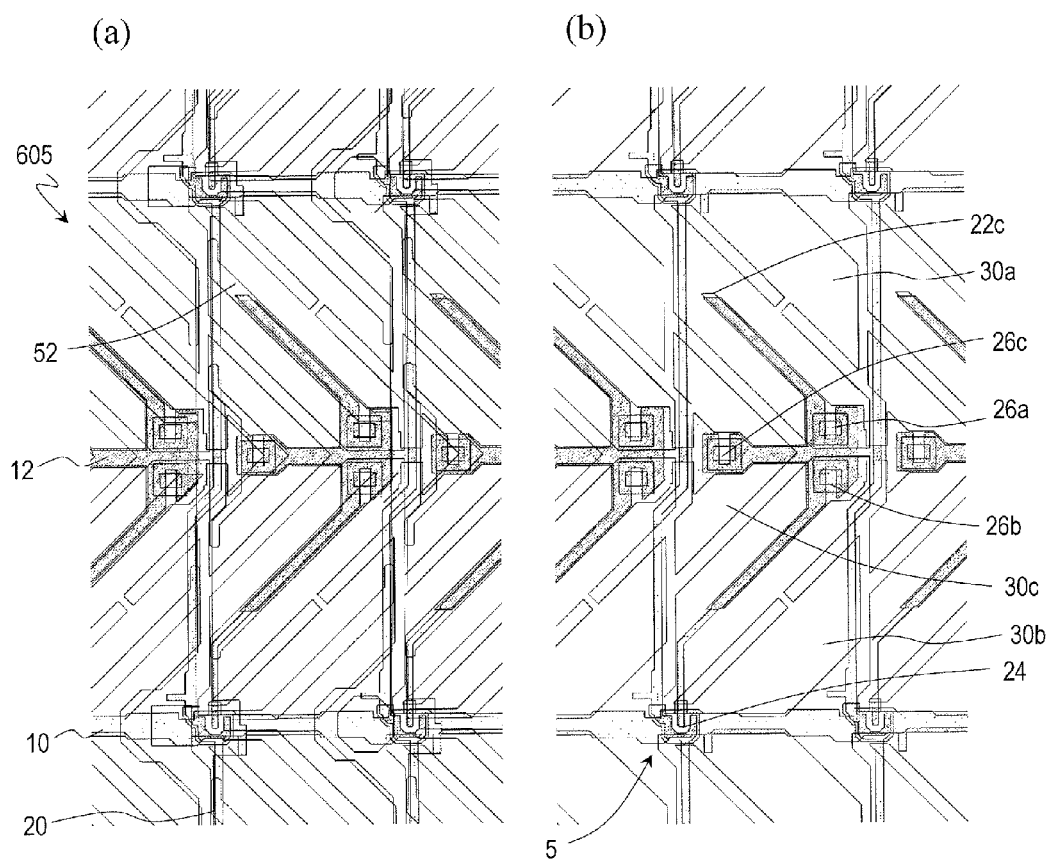
[FIG. 18] Plan views showing a liquid crystal display device (triple-divided pixel) of Embodiment 6, where (a) shows a TFT substrate and a counter substrate, and (b) only shows the TFT substrate.

FIGS. 18(a) and (b) show a liquid crystal display device 605 in which each pixel is divided into three. In the liquid crystal display device 605, three subpixel electrodes, namely, a subpixel electrode 30a, a subpixel electrode 30b, and a subpixel electrode 30c exist in one pixel. The subpixel electrode 30a and the subpixel electrode 30b are disposed separately above and below, within the pixel. The subpixel electrodes 30a, 30b, and 30c are connected to a drain electrode 24 of a TFT 5, respectively via contact holes 26a, 26b, and 26c which are correspondingly provided. Except that the pixel is thus divided into three, the liquid crystal display device 605 has a similar construction to that of the liquid crystal display device 600 above.

Figure 19:
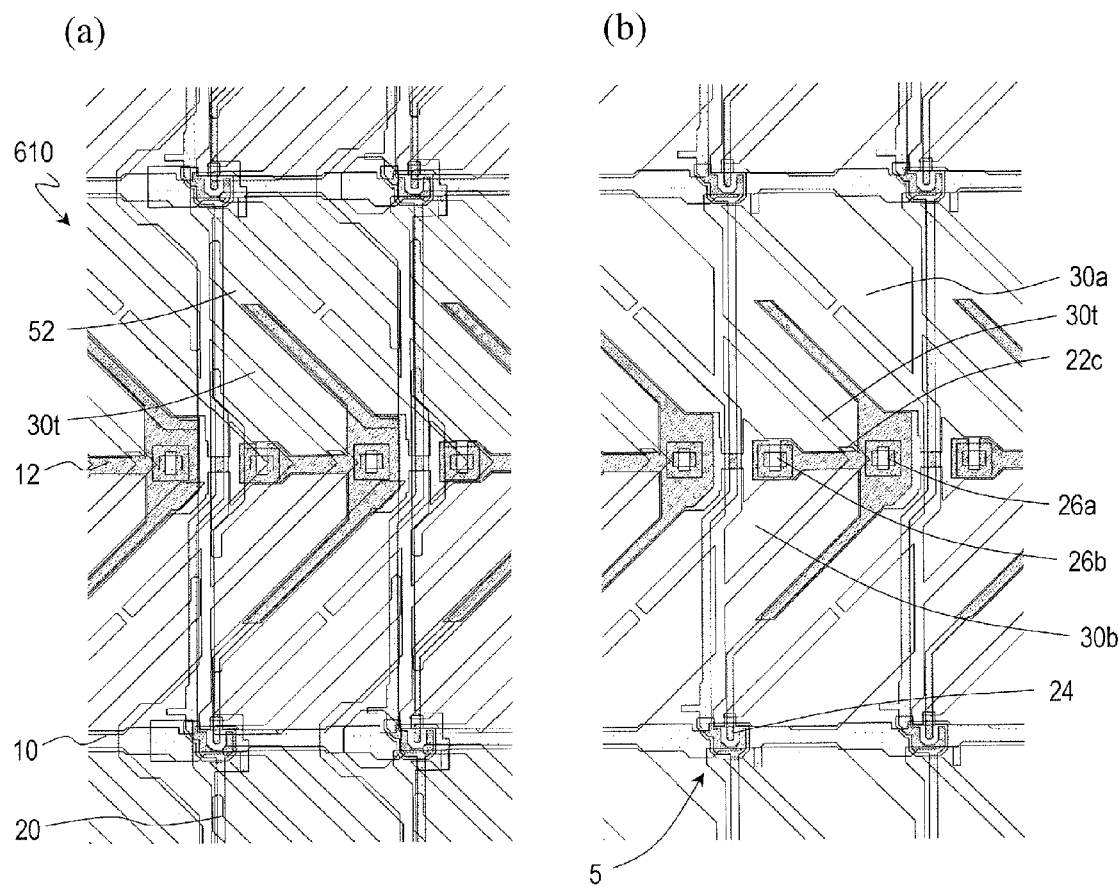
[FIG. 19] Plan views showing another implementation of a liquid crystal display device (double-divided pixel) of Embodiment 6, where (a) shows a TFT substrate and a counter substrate, and (b) only shows the TFT substrate.
Figure 20:
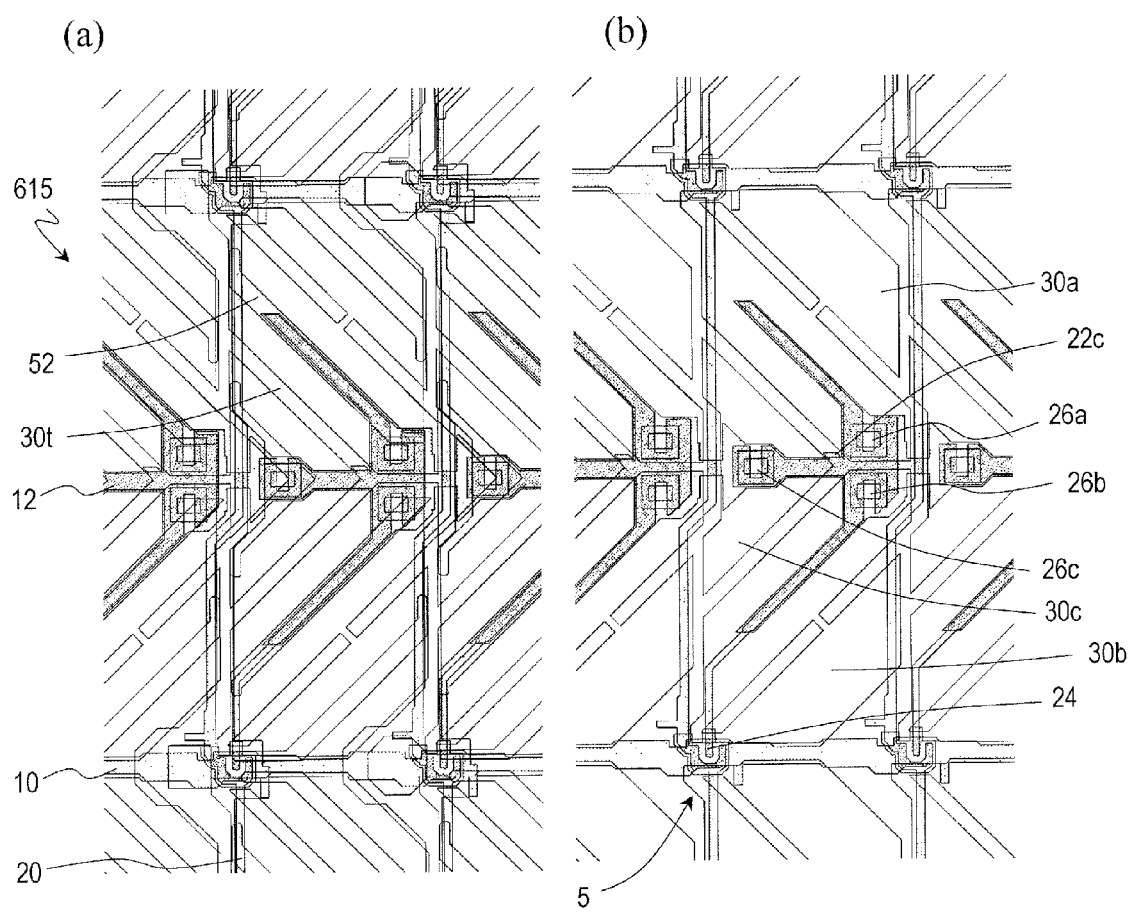
[FIG. 20] Plan views showing another implementation of a liquid crystal display device (triple-divided pixel) of Embodiment 6, where (a) shows a TFT substrate and a counter substrate, and (b) only shows the TFT substrate.

Next, FIGS. 19(a) and (b) show a variant liquid crystal display device 610. In an implementation adopting pixel division, the liquid crystal display device 610 includes a compensation portion 22c which is provided in an interspace 30t between the subpixel electrode 30a and the subpixel electrode 30b. FIG. 20(a) and FIG. 20(b) show a liquid crystal display device 615, which is an implementation of the liquid crystal display device 610 where division into three subpixels is made.

In each of the liquid crystal display devices described above, it is possible to compensate for fluctuations in storage capacitance even when a misalignment occurs, and the compensation portion 22c is provided at positions which do not lower the aperture ratio or increase the reflection unevenness of the display device (i.e., positions which do not contribute much to displaying). Therefore, good displaying can be achieved.

<Embodiment 7>

Figure 21:
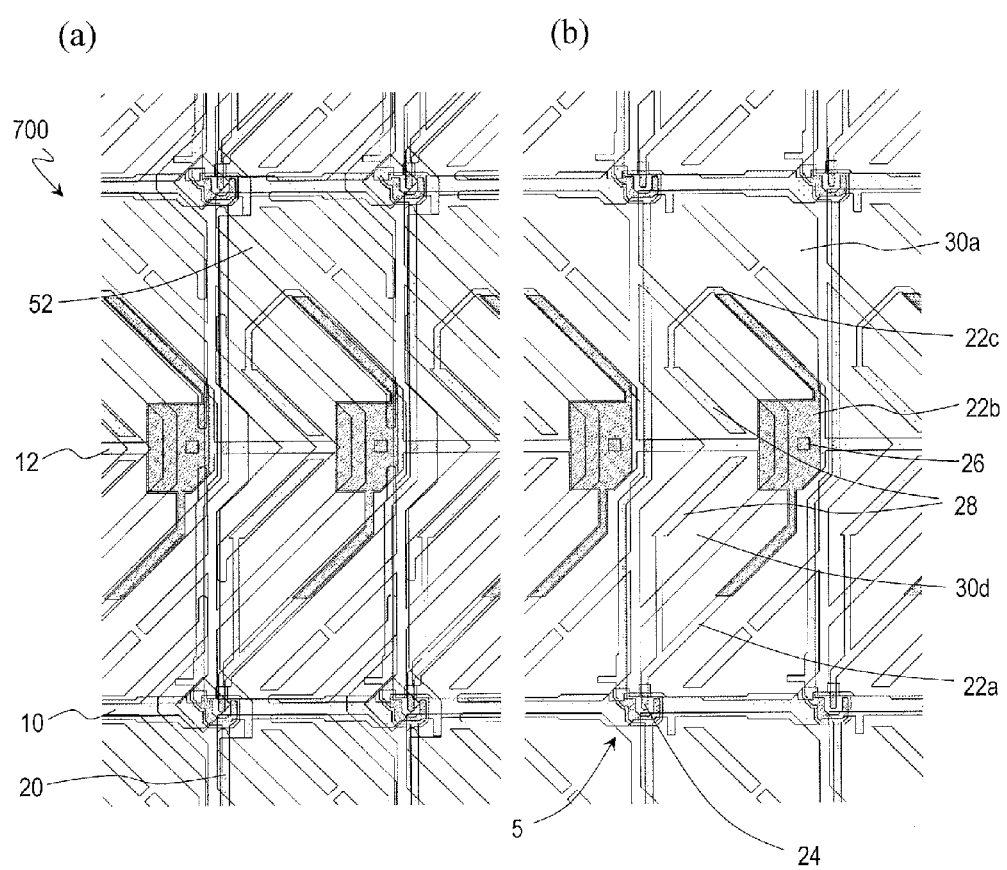
[FIG. 21] Plan views showing a liquid crystal display device of Embodiment 7, where (a) shows a TFT substrate and a counter substrate, and (b) only shows the TFT substrate.

FIGS. 21(a) and (b) show a liquid crystal display device 700 according to Embodiment 7. Pixel division is also adopted in the liquid crystal display device 700, such that a subpixel electrode 30a and a subpixel electrode 30d are provided within one pixel. The subpixel electrode 30a is connected to a drain electrode 24 of a TFT via a contact hole 26. On the other hand, the subpixel electrode 30d is in a floating state, without being directly connected to any connection line.

As in the other embodiments, a Cs counter electrode 22 extending from the drain electrode 24 is provided, such that a storage capacitance is formed between a Cs bus line 12 and itself. Furthermore, in the liquid crystal display device 700, a pair of coupling electrodes 28 located below the subpixel electrode 30d in a floating state are respectively connected to the connecting portion 22a and the compensation portion 22c of the Cs counter electrode. The pair of coupling electrodes 28 are disposed so that they each overlap a rib 52 which is provided as an alignment regulating structure on the counter substrate. In the present embodiment, the coupling electrodes 28 are divided by the Cs bus line 12 interposed therebetween, such that the Cs bus line 12 and the coupling electrodes 28 do not overlap. This is in order to prevent the coupling electrodes 28 from intersecting the Cs bus line 12 (or particularly its edge), and to further reduce short-circuit defects between the Cs bus line 12 and the coupling electrodes 28 and the possibility of reflection unevenness at the intersecting portion.

The compensation portion 22c is restricted to a portion where it does not overlap the subpixel electrode 30d in a floating state. Even in the case where the compensation portion 22c and the coupling electrode 28 are formed integrally, only the portion which does not overlap the subpixel electrode 30d in a floating state and which protrudes from the Cs bus line 12 is defined as the compensation portion 22c. Thus, the compensation portion 22c is a portion which creates a substantial storage capacitance between the Cs bus line 12 and itself, and make the capacitor created between any other electrode, e.g., the subpixel electrode 30d in a floating state, and itself as small as possible.

The coupling electrode 28 creates a coupling capacitance between the subpixel electrode 30d and itself. Between the coupling electrode 28 and the subpixel electrode 30d, an interlayer insulating film 46 as shown in FIG. 3 is provided. As the interlayer insulating film 46, an inorganic film of SiNx or the like which is formed with a film thickness of about 0.1 to 0.4 μm may be used alone in order to reduce the area of the coupling electrode 28, or an organic film having a small relative dielectric constant (about 0.2 to 0.4) may be stacked upon an inorganic film in order to reduce parasitic capacitance between the subpixel electrode 30d and the source bus line 20 and gate bus line 10; and so on.

In this construction, a potential which is different from that of the subpixel electrode 30a directly connected to the TFT 5 is applied to the subpixel electrode 30d. Such a construction is described in Patent Document 4, for example.

Moreover, as in the liquid crystal display device 500 shown in FIG. 15 or the like, the compensation portion 22c in the liquid crystal display device 700 of the present embodiment is disposed so as to overlap a rib 52 which is provided as an alignment regulating structure on the counter substrate.

Figure 22:
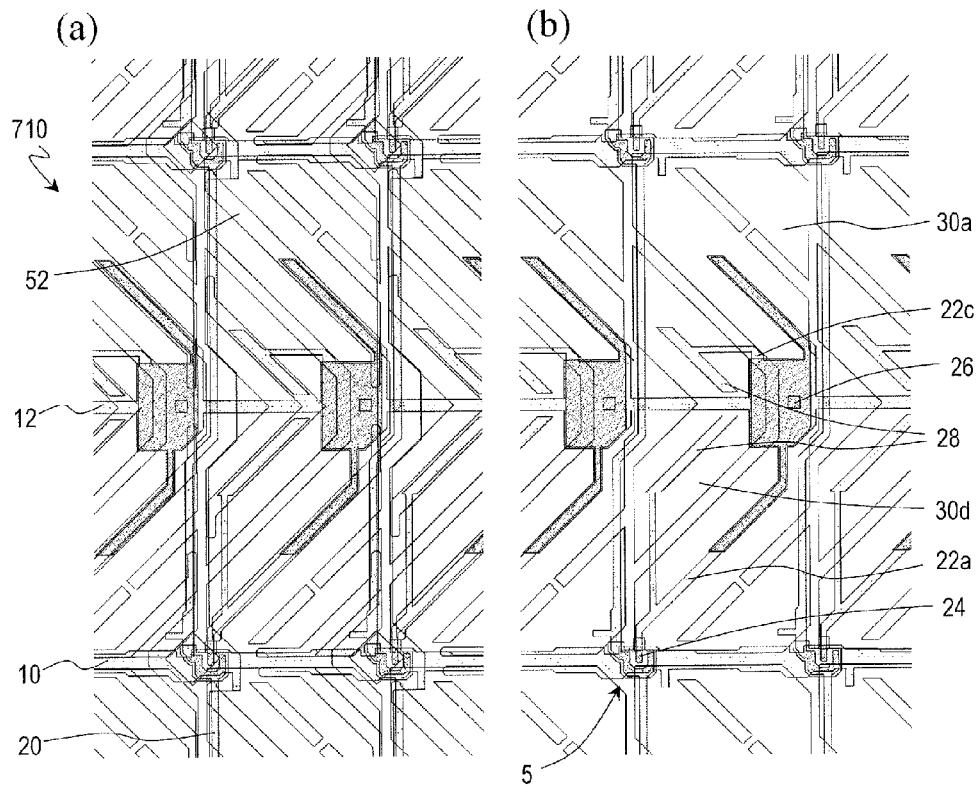
[FIG. 22] Plan views showing another implementation of a liquid crystal display device of Embodiment 7, where (a) shows a TFT substrate and a counter substrate, and (b) only shows the TFT substrate.

Next, with reference to FIGS. 22(a) and (b), a variant liquid crystal display device 710 will be described.

In the liquid crystal display device 710, a compensation portion 22c is provided in an interspace between a subpixel electrode 30a which is directly connected to a TFT and the subpixel electrode 30d in a floating state. Similarly to the liquid crystal display device 700 above, the a subpixel electrode 30d creates a coupling capacitance between the coupling electrode 28 and itself.

In these liquid crystal display devices, the compensation portion 22c overlaps the subpixel electrode 30a which is directly connected to a TFT. Since the same level of voltage is applied to the compensation portion 22c and to the subpixel electrode 30a, no storage capacitance is created therebetween.

Figure 23:
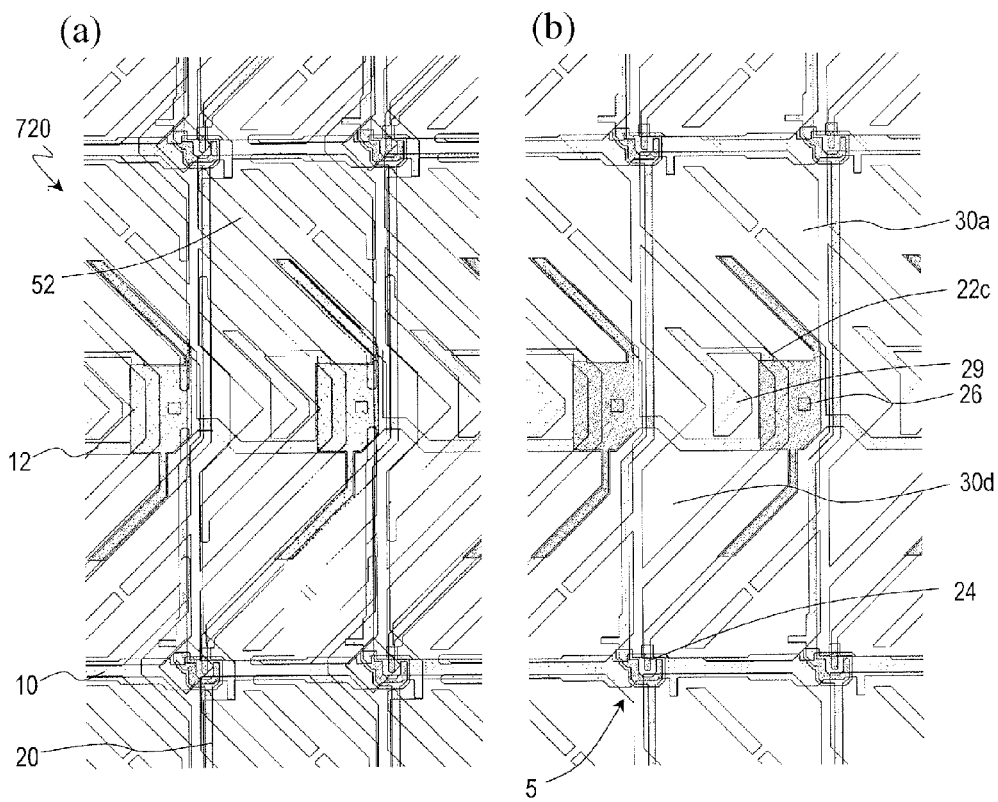
[FIG. 23] Plan views showing still another implementation of a liquid crystal display device of Embodiment 7, where (a) shows a TFT substrate and a counter substrate, and (b) only shows the TFT substrate.

Furthermore, with reference to FIGS. 23(a) and (b), another implementation of a liquid crystal display device 720 will be described. The liquid crystal display device 720 differs from the liquid crystal display device 710 in that a coupling electrode 29 is provided which is connected to a compensation portion 22c. Since the compensation portion 22c is formed so as to protrude from a capacitive portion 22b, the compensation portion 22c can be utilized as a connecting portion to the coupling electrode 29.

As described above, the compensation portion 22c is a portion which is provided so as to create a substantial storage capacitance between the storage capacitor bus line 12 and itself. In an implementation as shown in FIGS. 23(a) and (b), it refers to a portion which protrudes from the capacitive portion 22b and which is interposed between the subpixel electrodes 30a and 30d, not including any portion (coupling electrode 29) overlapping the subpixel electrode 30d.

In any one of the liquid crystal display devices described above, the compensation portion 22c is provided at positions which do not lower the aperture ratio or increase the reflection unevenness of the display device. Therefore, good displaying can be achieved.

<Embodiment 8>

In the present embodiment, an active matrix substrate which is applicable to a reflection type display device will be described. Not only for use in a reflection type liquid crystal display device, this active matrix substrate is also suitably used in a reflection type display device, e.g., a microencapsulated electrophoretic type, that is adopted in electronic paper.

Figure 24:
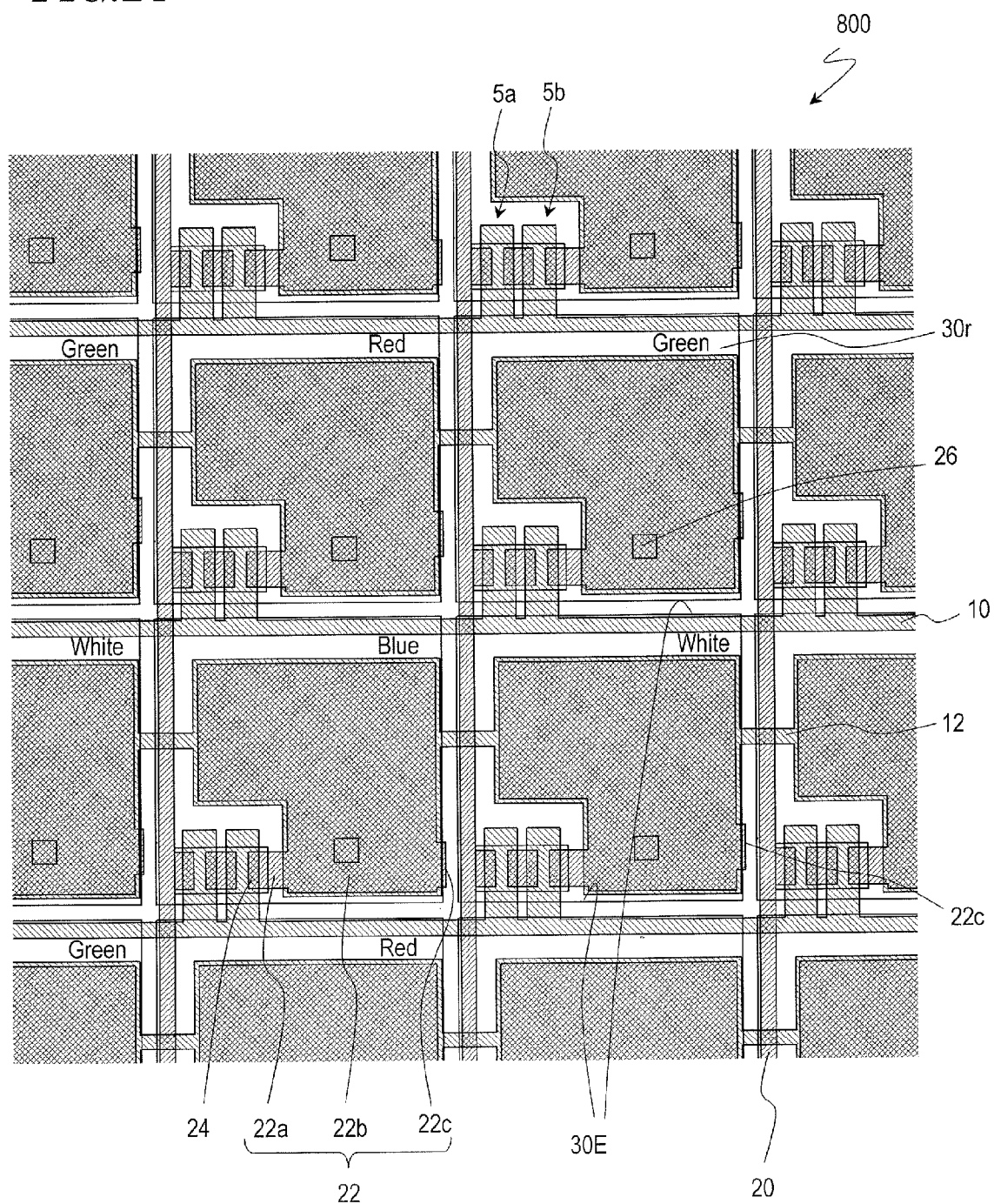
[FIG. 24] A plan view showing a TFT substrate of Embodiment 8.

FIG. 24 shows a TFT substrate 800 according to Embodiment 8. In the TFT substrate 800, one pixel size is a square shape of about 100 µm×about 100 µm. Similarly to the implementation shown in FIG. 10, the TFT substrate 800 has a construction adapted to pixels of four colors (R, G, B, W).

A pixel electrode (reflection electrode) 30r, which is formed by using a reflection film such as an Al film, an Al—Mo multilayer film, or an Ni film, has a function of reflecting external light. A transparent electrode (ITO or IZO) may be stacked on this reflection film.

On the surface of an interlayer insulating film as an underlayer of the pixel electrode (reflection electrode), bumps and dents of sizes on the order of several µm to ten and several µm may be formed. These bumps and dents define the shape of the surface of a pixel electrode 30r which is formed thereon. By forming minute bumps and dents on the surface of the pixel electrode 30r, it is possible to improve the light reflection characteristics at the pixel electrode 30r and uniformly disperse the intensity of reflected light, whereby brighter displaying can be achieved with an improved quality.

Moreover, the pixel electrode 30r is disposed so as to cover the gate bus line 10 and the source bus line 20. As a result, reflection unevenness associated with the bus line wiring material can be suppressed. Moreover, influences of changes in the voltage of the bus line can be prevented, and alignment anomalies of the liquid crystal can be suppressed. Moreover, since the pixel electrode 30r as a reflection electrode is provided so as to cover the TFTs 5a and 5b, there is no need to dispose a BM for blocking external light on the TFTs. Therefore, the effective area of reflection can be increased.

In the present embodiment, two TFTs 5a and 5b are successively provided for one pixel. This is in order to reduce the current leaking from the TFTs 5a and 5b during a period in which a voltage applied to the pixel is retained (i.e., an OFF state of the TFTs 5a and 5b). However, there may be only one TFT, as has been described in the other embodiments.

In the TFT substrate 800, the compensation portion 22c is disposed at an interspace with an adjacent pixel electrode on the right-hand side. The compensation portion 22c is provided so as to be opposite from the connecting portion 22a extending from the drain electrode 24, with the capacitive portion 22b sandwiched therebetween. Similarly to the other embodiments, the compensation portion 22c being provided makes it possible to suppress fluctuations in storage capacitance that are caused by misalignment. In the TFT substrate 800, too, the direction in which the drain electrode 24 protrudes toward the gate electrode 10a and the direction in which the compensation portion 22c protrudes from the Cs bus line 12 are opposite. Therefore, it is possible to compensate for fluctuations in feed-through voltage due to fluctuations in the parasitic capacitance Cgd that are caused by misalignments.

Moreover, the position of the compensation portion 22c is changed for each pixel color so as to correspond to each pixel color among the four colors (R, G, B, W). As a result of this, similarly to the implementation shown in FIG. 10, the compensation portion 22c can be utilized as a marker indicating the pixel color.

Although the above illustrates a case where the TFT substrate 800 is used for a reflection type liquid crystal display device, the TFT substrate 800 can also be used for electronic paper of a microencapsulated electrophoretic type. Hereinafter, an implementation which is applicable to a display device of a microencapsulated electrophoretic type, for use as electronic paper, will be described.

Electronic paper typically has a construction such that a microcapsule layer is provided between a TFT substrate and a counter substrate disposed opposite therefrom. The microcapsules are of a transparent resin, having a diameter of several dozen to several hundred µm. Inside the microcapsules, positively-charged white particles and negatively-charged black particles are mixed in a transparent insulative dispersion medium, for example. The microcapsule layer is a resin layer in which a large number of microcapsules as such are disposed. A positive or negative voltage is applied to a predetermined region of this microcapsule layer to cause electrophoresis of white particles and black particles within the microcapsules, whereby displaying can be achieved.

Using the TFT substrate 800 as a rear substrate, and sandwiching the microcapsule layer between this rear substrate and a viewer-side substrate (counter substrate), a display device (electronic paper) becomes available. On the viewer-side substrate, a transparent common electrode (ITO, IZO, etc.) is formed across essentially the entire display region, similarly to a liquid crystal display device. The viewer-side substrate can be formed by using a resin substrate (plastic substrate). Such electronic paper is produced by, for example, providing a microcapsule layer on the viewer-side substrate via coating, and attaching together the multilayer structure of these and the TFT substrate 800. For use in electronic paper, minute bumps and dents do not need to be provided on the surface of the interlayer insulating film which is provided on the TFT substrate 800.

Moreover, by using ITO or IZO, transparent pixel electrodes may be employed as the electrodes to be provided on the TFT substrate 800. In the case where transparent pixel electrodes are provided on the TFT substrate 800, it is possible to utilize the TFT substrate 800 as the viewer-side substrate.

Similarly to a liquid crystal display device, a color filter layer may be formed on the counter substrate (resin substrate/plastic substrate). This enables color displaying. In the case where no color filter layer is formed, monochrome displaying will be attained, but the efficiency of light utilization will be higher than in the case of color displaying. Therefore, bright displaying with a high contrast ratio can be achieved, which is favorable in the case where a display device according to the present invention is used as an e-book or the like which is specialized for text displaying.

Moreover, the TFT substrate 800 may also be produced by using a plastic substrate. By using a plastic TFT substrate, electronic paper with a thickness of about 0.5 mm can also be obtained. Since electronic paper produced as such has flexibility, it is expected promising for use in various implementations.

Figure 25:
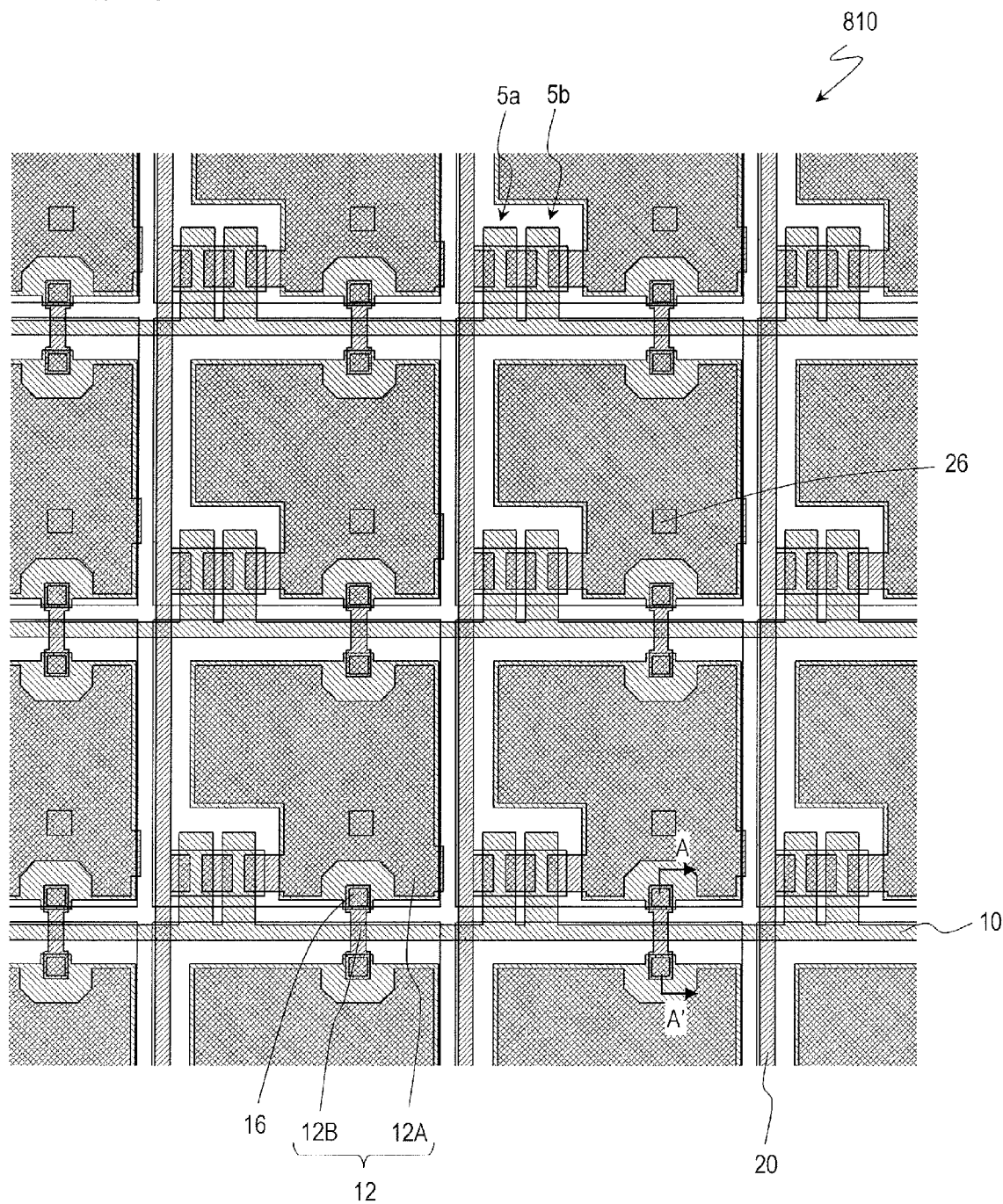
[FIG. 25] A plan view showing a TFT substrate according to a variant of Embodiment 8.

Next, with reference to FIG. 25, a variant of the TFT substrate 800 will be described. In a variant TFT substrate 810, a storage capacitor bus line 12 intersects a gate bus line 10, and extends in a direction which is parallel to a source bus line 20.

In the TFT substrate 810, the storage capacitor bus line 12 has a storage capacitor-forming portion 12A, and an intersection 12B with the gate bus line 10. The intersection 12B electrically connects two storage capacitor-forming portions 12A that are respectively associated with adjacent pixels. Similarly to the TFT substrate 800, the storage capacitor-forming portion 12A is formed of the same layer as the gate bus line 10. On the other hand, the intersection 12B with the gate bus line 10 is formed of the same layer as the source bus line 20 (i.e., on a gate insulating film).

Figure 26:
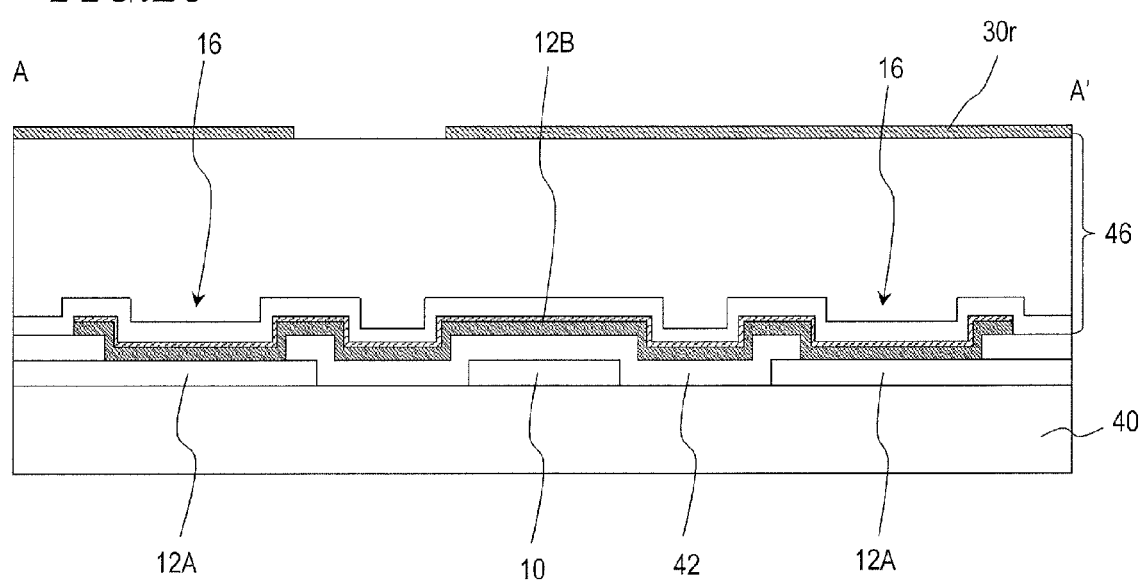
[FIG. 26] A cross-sectional view of the TFT substrate shown in FIG. 25 along line A-A'.

FIG. 26 shows an implementation of connection between the storage capacitor-forming portion 12A and the intersection 12B in the storage capacitor bus line 12. As shown in the figure, connection of the storage capacitor-forming portion 12A is achieved as the intersection 12B makes electrical contact with each storage capacitor-forming portion 12A via a contact hole 16 which is formed in the gate insulating film 42.

In such a construction, the source bus line 20 and the storage capacitor bus line 12 do not intersect, and thus interference between signal voltages applied thereto is prevented. Therefore, the load on the source bus line 20 can be reduced, thus reducing power consumption.

Thus, embodiments of the active matrix substrate according to the present invention and the display device in which the same is used have been described. The active matrix substrate according to the present invention is applicable to various display devices in which compensation of storage capacitances that are associated with pixel electrodes is desired. For example, it is applicable to a transflective type liquid crystal display device for use in mobile devices or the like. Moreover, it is also applicable to a liquid crystal display device of a lateral electric-field mode in which a common electrode is formed on the active matrix substrate rather than on the counter substrate. Moreover, it is also applicable to horizontal electrophoresis type display devices for use in electronic paper, and so on.

INDUSTRIAL APPLICABILITY

A liquid crystal display device in which an active matrix substrate according to an embodiment of the present invention is broadly applicable as various liquid crystal display devices, such as liquid crystal television sets.

An active matrix substrate according to an embodiment of the present invention is applicable not only to liquid crystal display devices, but also other display devices, e.g., microencapsulated electrophoretic type electronic paper.

REFERENCE SIGNS LIST

5 TFT
10 gate bus line
10a gate electrode
12 storage capacitor bus line
20 source bus line
20a source electrode
22 storage capacitor counter electrode
22a connecting portion
22b capacitive portion
22c compensation portion
24 drain electrode
26 contact hole
30 pixel electrode
30E pixel electrode edge
100 active matrix substrate

The invention claimed is:

1. An active matrix substrate comprising:
a substrate;
a gate bus line provided on the substrate;
a source bus line provided on the substrate so as to intersect the gate bus line;
a TFT provided near an intersection between the gate bus line and the source bus line, the TFT having a gate electrode electrically connected to the gate bus line, a source electrode electrically connected to the source bus line, and a drain electrode;
a pixel electrode electrically connected to the drain electrode of the TFT;
a storage capacitor bus line provided in parallel to the gate bus line or the source bus line; and
a storage capacitor counter electrode electrically connected to the drain electrode to create a storage capacitance with the storage capacitor bus line, wherein the storage capacitor counter electrode includes:
a first portion overlapping the storage capacitor bus line to create a substantial storage capacitance;
a second portion interposed between the first portion and the drain electrode; and
a third portion being provided opposite from the second portion with the first portion sandwiched therebetween, the third portion protruding from the first portion and overlapping the storage capacitor bus line, but not overlapping any pixel electrode other than the pixel electrode electrically connected to the drain electrode of the TFT; and
the storage capacitor bus line has a recessed portion at a position where the third portion is formed.

2. The active matrix substrate of claim 1, wherein the third portion includes a portion not overlapping the storage capacitor bus line.

3. The active matrix substrate of claim 1, wherein,
the storage capacitor bus line includes a bus line portion extending in parallel to the gate bus line, and a branch portion provided in a direction intersecting the bus line portion; and
the second portion of the storage capacitor counter electrode and the branch portion of the storage capacitor bus line overlap each other.

4. The active matrix substrate of claim 1, wherein the third portion at an edge of the storage capacitor bus line has a width which is equal to a width of the second portion at the edge of the storage capacitor bus line.

5. The active matrix substrate of claim 1, wherein the third portion at an edge of the storage capacitor bus line has a width which is greater than a width of the second portion at the edge of the storage capacitor bus line.

6. An active matrix substrate comprising:
a substrate;
a gate bus line provided on the substrate;
a source bus line provided on the substrate so as to intersect the gate bus line;
a TFT provided near an intersection between the gate bus line and the source bus line, the TFT having a gate electrode electrically connected to the gate bus line, a source electrode electrically connected to the source bus line, and a drain electrode;
a pixel electrode electrically connected to the drain electrode of the TFT;
a storage capacitor bus line provided in parallel to the gate bus line or the source bus line;
a storage capacitor counter electrode electrically connected to the drain electrode to create a storage capacitance with the storage capacitor bus line, wherein the storage capacitor counter electrode includes:
a first portion overlapping the storage capacitor bus line to create a substantial storage capacitance;
a second portion interposed between the first portion and the drain electrode; and
a third portion being provided opposite from the second portion with the first portion sandwiched therebetween, the third portion protruding from the first portion and overlapping the storage capacitor bus line, but not overlapping any pixel electrode other than the pixel electrode electrically connected to the drain electrode of the TFT;

a plurality of pixels are defined; and in at least two pixels among the plurality of pixels, a position of the third portion within the pixel differs.

7. The active matrix substrate of claim 1, wherein,
a plurality of pixels forming a delta array are defined; and
the third portion associated with a predetermined pixel is placed between pixel electrodes of two pixels adjacent to the predetermined pixel in an oblique direction.

8. The active matrix substrate of claim 1, wherein a direction in which the drain electrode extends toward the gate electrode and a direction in which the third portion protrudes from the storage capacitor bus line are 180° apart.

9. The active matrix substrate of claim 1, wherein, in a direction which is 180° apart from a direction in which the drain electrode extends toward the gate electrode, a fourth portion of the storage capacitor counter electrode is formed so as to protrude from the storage capacitor bus line.

10. A display device comprising:
an active matrix substrate including:
a substrate;
a gate bus line provided on the substrate;
a source bus line provided on the substrate so as to intersect the gate bus line;
a TFT provided near an intersection between the gate bus line and the source bus line, the TFT having a gate electrode electrically connected to the gate bus line, a source electrode electrically connected to the source bus line, and a drain electrode;
a pixel electrode electrically connected to the drain electrode of the TFT;
a storage capacitor bus line provided in parallel to the gate bus line or the source bus line; and
a storage capacitor counter electrode electrically connected to the drain electrode to create a storage capacitance with the storage capacitor bus line, wherein
the storage capacitor counter electrode includes:
a first portion overlapping the storage capacitor bus line to create a substantial storage capacitance;
a second portion interposed between the first portion and the drain electrode; and
a third portion being provided opposite from the second portion with the first portion sandwiched therebetween, the third portion protruding from the first portion and overlapping the storage capacitor bus line, but not overlapping any pixel electrode other than the pixel electrode electrically connected to the drain electrode of the TFT;

a counter substrate disposed opposite from the active matrix substrate; and a display medium layer disposed between the active matrix substrate and the counter substrate wherein the display medium layer is a liquid crystal layer;

at least one of the active matrix substrate and the counter substrate has a black matrix; and the third portion of the storage capacitor counter electrode is disposed at a position overlapping the black matrix.

11. The display device of claim 10, wherein,
the display medium layer is a vertical-alignment type liquid crystal layer; and
an alignment regulating structure for forming a plurality of liquid crystal domains is provided on at least one of the active matrix substrate and the counter substrate.

12. The display device of claim 11, wherein the third portion of the storage capacitor counter electrode is provided at a position overlapping the alignment regulating structure.

13. The active matrix substrate of claim 6, wherein the third portion includes a portion not overlapping the storage capacitor bus line.

14. The active matrix substrate of claim 6, wherein,
the storage capacitor bus line includes a bus line portion extending in parallel to the gate bus line, and a branch portion provided in a direction intersecting the bus line portion; and
the second portion of the storage capacitor counter electrode and the branch portion of the storage capacitor bus line overlap each other.

15. The active matrix substrate of claim 6, wherein the third portion at an edge of the storage capacitor bus line has a width which is equal to a width of the second portion at the edge of the storage capacitor bus line.

16. The active matrix substrate of claim 6, wherein the third portion at an edge of the storage capacitor bus line has a width which is greater than a width of the second portion at the edge of the storage capacitor bus line.

17. The active matrix substrate of claim 6, wherein a direction in which the drain electrode extends toward the gate electrode and a direction in which the third portion protrudes from the storage capacitor bus line are 180° apart.

18. The active matrix substrate of claim 6, wherein, in a direction which is 180° apart from a direction in which the drain electrode extends toward the gate electrode, a fourth portion of the storage capacitor counter electrode is formed so as to protrude from the storage capacitor bus line.

* * * * *